US008548039B2

(12) United States Patent
Hayase et al.

(10) Patent No.: US 8,548,039 B2
(45) Date of Patent: Oct. 1, 2013

(54) VIDEO SCALABLE ENCODING METHOD AND DECODING METHOD, APPARATUSES THEREFOR, PROGRAMS THEREFOR, AND RECORDING MEDIA WHERE PROGRAMS ARE RECORDED

(75) Inventors: Kazuya Hayase, Yokosuka (JP); Yukihiro Bandoh, Yokosuka (JP); Seishi Takamura, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 658 days.

(21) Appl. No.: 12/682,370

(22) PCT Filed: Oct. 20, 2008

(86) PCT No.: PCT/JP2008/068971
§ 371 (c)(1),
(2), (4) Date: Apr. 9, 2010

(87) PCT Pub. No.: WO2009/054347
PCT Pub. Date: Apr. 30, 2009

(65) Prior Publication Data
US 2010/0215095 A1 Aug. 26, 2010

(30) Foreign Application Priority Data
Oct. 25, 2007 (JP) .................................. 2007-277224

(51) Int. Cl.
*H04N 7/26* (2006.01)
*H04N 7/50* (2006.01)

(52) U.S. Cl.
USPC ..................................... 375/240; 375/E7.026

(58) Field of Classification Search
None
See application file for complete search history.

(56) References Cited

U.S. PATENT DOCUMENTS 6,895,055 B2 * 5/2005 Peng et al. ............... 375/240.18
6,931,060 B1 * 8/2005 Jiang et al. ............... 375/240.03

(Continued)

FOREIGN PATENT DOCUMENTS

JP 10-032824 A 2/1998
JP 2006-054802 A 2/2006

(Continued)

OTHER PUBLICATIONS

Schwartz et al, "Overview of Scalable Video Coding Extension of the H.264/AVC Standard", IEEE Transactions on Circuits and Systems for Video Technology, vol. 17, No. 9, Sep. 2007, pp. 1103-1120.*

(Continued)

*Primary Examiner* — Jay Patel
*Assistant Examiner* — Reza Aghevli
(74) *Attorney, Agent, or Firm* — Harness, Dickey & Pierce, P.L.C.

(57) ABSTRACT

In a video scalable encoding method, based on encoding information of an immediately-lower image region in an immediately-lower layer, which is present at spatially the same position as an encoding target image region, a data structure of the weight coefficient, that includes a proportional coefficient and an offset coefficient, is determined. When the immediately-lower image region performed interframe prediction in the immediately-lower layer, the method identifies an immediately-lower layer reference image region that the immediately-lower image region used as a prediction reference for motion prediction, and calculates the weight coefficient by applying a weight coefficient that the immediately-lower image region used in weighted motion prediction to a DC component of an image region in the upper layer, which is present at spatially the same position as the immediately-lower layer reference image region, and assuming a result of the application as a DC component of the immediately-lower image region.

26 Claims, 20 Drawing Sheets

(56) References Cited

U.S. PATENT DOCUMENTS

| | | | |
|---|---|---|---|
| 6,937,659 B1* | 8/2005 | Nguyen et al. | 375/240.19 |
| 7,372,904 B2* | 5/2008 | Jiang et al. | 375/240.02 |
| 7,720,152 B2* | 5/2010 | Boyce | 375/240.16 |
| 2006/0245498 A1 | 11/2006 | Lee et al. | |
| 2006/0291554 A1* | 12/2006 | Welles et al. | 375/240 |
| 2006/0291562 A1* | 12/2006 | Lee et al. | 375/240.16 |
| 2008/0267291 A1* | 10/2008 | Vieron et al. | 375/240.16 |
| 2009/0080535 A1 | 3/2009 | Yin et al. | |
| 2009/0207919 A1 | 8/2009 | Yin et al. | |
| 2010/0158110 A1* | 6/2010 | Pandit et al. | 375/240.12 |

FOREIGN PATENT DOCUMENTS

| | | |
|---|---|---|
| RU | 2005 113 316 A | 9/2005 |
| RU | 2 335 860 C2 | 10/2008 |
| WO | 2004/098197 A1 | 11/2004 |
| WO | 2006/087314 A1 | 8/2006 |
| WO | 2007/018669 A1 | 2/2007 |
| WO | 2007/018670 A1 | 2/2007 |
| WO | 2007/047271 A2 | 4/2007 |
| WO | 2009/005071 A1 | 1/2009 |

OTHER PUBLICATIONS

Richardson, Iain, "H.264 and MPEG-4 Video Compression: Video Coding for Next-generation Multimedia," Wiley: 2005, pp. 141-149.

Lee, Kyohyuk, "Extension of weighted prediction to multi layer structure," Joint Video Team (JVT) of ISO/IEC MPEG & ITU-T VCEG, Doc. JVT-P076, 16th Meeting: Poznan, Poland, Jul. 25-29, 2005.

Peng, Yin, et al., "Localized Weighted Prediction for Video Coding," Conference Proceedings, IEEE International Symposium on Circuits and Systems, Kobe, Japan, May 23-26, 2005, pp. 4365-4368.

Kadono, Shinya, et al., "Implicit Weighed Bi-prediction using DC Offset Value," Joint Video Team (JVT) of ISO/IEC MPEG & ITU-T VCEG (ISO/IEC JTC1/SC29/WG11 and ITU-T SG16 Q.6), Document JVT-E077, 5th Meeting: Geneva, Switzerland, Oct. 9-17, 2002.

ITU-T: "Advanced video coding for generic audiovisual services," ITU-T Rec. H. 264, pp. 129-132, May 2003.

T. Wiegand, G. Sullivan, J. Reichel, H. Schwarz and M. Wien: "Joint Draft 8 of SVC Amendment", ISO/IEC JTC1/SC29/WG11 and ITU-T SG16 Q.6, JVT-U201, pp. 166-170, Oct. 2006.

J. Reichel, H. Schwarz and M. Wien: "Joint Scalable Video Model JSVM-8", ISO/IEC JTC1/SC29/WG11 and ITU-T SG16 Q.6, JVT-U202, Oct. 2006 (Only the head page is appended because the document explains a program "JSVM" which includes no process relating to the present invention).

Kazuya Hayase, Yukuhiro Bandoh, Seishi Takamura, Kazuto Kamikura and Yoshiyuki Yashima: Weighted Prediction of Spatial scalable Video Coding using Inter-Layer Correlation, FIT 2007, Sixth Forum on Information Science and Technology, pp. 253-256, Sep. 2007, with English language summary.

Notice of Reasons for Rejection, Japanese Patent Application No. 2009-538193, Oct. 2, 2012.

* cited by examiner

VIDEO SCALABLE ENCODING METHOD AND DECODING METHOD, APPARATUSES THEREFOR, PROGRAMS THEREFOR, AND RECORDING MEDIA WHERE PROGRAMS ARE RECORDED

This application is a National Stage of International Application No. PCT/JP2008/068971, filed Oct. 20, 2008. This application claims the benefit and priority of Japanese Application No. 2007-277224, filed Oct. 25, 2007. The entire disclosure of each of the above applications is incorporated herein by reference.

TECHNICAL FIELD

The present invention relates to a video scalable encoding method and device therefor that in a scalable manner encode a video image whose brightness varies over time, a video scalable decoding method and device therefor that decode encoded data that was encoded by the video scalable encoding, a video scalable encoding program used in realizing the video scalable encoding method, a computer-readable recording medium where the program is stored, a video scalable decoding program used in realizing the video scalable decoding method, and a computer-readable recording medium where the program is stored.

Priority is claimed on Japanese Patent Application No. 2007-277224, filed Oct. 25, 2007, the content of which is incorporated herein by reference.

BACKGROUND ART

In conventional video encoding methods, motion prediction is performed by block-matching based on minimization of the difference in pixel values between frames, thereby enhancing the encoding performance. However, for an image such as a fade image whose brightness varies over time, the prediction residual of the motion prediction increases by an amount equivalent to the brightness variation, and the encoding performance is thereby degraded.

Accordingly, in H.264/AVC shown in Non-Patent Document 1, weighted motion prediction is performed by adaptively applying a weight coefficient to a reference picture for motion prediction. This weighted motion prediction generates a prediction reference signal with corrected temporal brightness variation, thereby enhancing the encoding performance.

H.264/AVC includes two methods for weighted motion prediction: explicit mode which encodes a weight coefficient used in brightness correction and transmits it, and implicit mode which, instead of transmitting the weight coefficient, uses reference frame information to indirectly create the same weight coefficient at an encoder and a decoder. Table 1 shows categories and predicting methods of weighted motion prediction in P slice and B slice.

TABLE 1

Categories and Methods of Weighted Motion Prediction in H.264/AVC

| Type | Prediction Category | Prediction Signal | Coefficient Transmission |
|---|---|---|---|
| P slice | — | $z = w_0 \cdot r_0 + d_0$ | Transmit $w_0$, $d_0$ (Explicit) |
| B slice | L0/L1 Prediction | $z = w_0 \cdot r_0 + d_0$ (L0 Prediction) | Transmit $w_0$, $d_0$, $w_1$, $d_1$ (Explicit) |
| | | $z = w_1 \cdot r_1 + d_1$ (L1 Prediction) | |
| | Bi-Prediction | $z = w_0 \cdot r_0 + w_1 \cdot r_1 + d$ ($d = 1/2(d_0 + d_1)$) | Transmit $w_0$, $d_0$, $w_1$, $d_1$ (Explicit) |
| | | $z = w_0 \cdot r_0 + w_1 \cdot r_1$ | Calculate $w_0$ and $w_1$ in accordance with distance from reference picture (Implicit) |

In Table 1, z is a weighted motion prediction signal, $r_0$ and $r_1$ are weighted motion prediction reference signals, $w_0$, $w_1$, $d_0$, and $d_1$ are weight coefficients. Weighted motion prediction switching and weight coefficient transmission mode selection are executed in slice units.

FIG. 20 is an explanatory diagram of weighted motion prediction (implicit mode) in H.264/AVC. Implicit mode is used only for bi-prediction in B slices. Assuming that brightness variation in an encoding target frame and two reference frames is linear, proportional coefficients $w_0$ and $w_1$ are calculated in accordance with the distance from the reference frames. An offset coefficient d is set at 0.

While in the example of FIG. 20, the proportional coefficients are calculated by internal division in accordance with the distances from the reference frames, calculation by external division can be performed in the same way.

A scalable extension method (JSVC) in the H.264/AVC shown in Non-Patent Document 2 has been standardized by the NT, which is a joint team of the ISO and the ITU-T, and currently employs the same weighted motion prediction as the H.264/AVC mentioned above. A JSVC reference encoder JSVM shown in Non-Patent Document 3 also uses the weighted motion prediction shown in Table 1.

One known technology for detecting the overall change in brightness of a video image and performing brightness compensation is disclosed in Patent Document 1. The technology disclosed in Patent Document 1 uses an overall brightness variation amount of an entire screen, and a flag indicating a determination of whether to compensate brightness variation in each small region, and can be used in cases where the brightness variation is non-uniform within the screen.

Non-Patent Document 1: ITU-T: "Advanced video coding for generic audiovisual services", ITU-T Rec. H.264, pp. 129-132, May, 2003.

Non-Patent Document 2: T. Wiegand, G. Sullivan, J. Reichel, H. Schwarz and M. Wien: "Joint Draft 8 of SVC Amendment", ISO/IEC JTC1/SC29/WG11 and ITU-T SG16 Q.6, JVT-U201, pp. 166-170, October, 2006.

Non-Patent Document 3: J. Reichel, H. Schwarz and M. Wien: "Joint Scalable Video Model JSVM-8", ISO/IEC JTC1/SC29/WG11 and ITU-T SG16 Q.6, JVT-U202, October, 2006.

Patent Document 1: Japanese Unexamined Patent Publication, First Publication No. H10-32824.

DISCLOSURE OF THE INVENTION

Problems to be Solved by the Invention

Weighted motion prediction in H.264/AVC is executed in slice units. Therefore, in cases where there is brightness variation in a part of a slice, and where the brightness variation is non-uniform within the slice, the prediction performance of the weighted motion prediction is degraded. An example is brightness variation caused by the shadow of a moving object and such like. Since JSVC inherits weighted motion prediction in H.264/AVC, it faces the same problem.

If it is attempted to perform weighted motion prediction by calculating the weight coefficient in units smaller than slices, such as macroblocks, the encoding amount needed for the weight coefficient in explicit mode will be extremely large. In such cases, the weight coefficient is preferably calculated in implicit mode. However, as explained above, the implicit mode of weighted motion prediction in H.264/AVC is limited to bi-prediction in B slices.

Furthermore, since the weight coefficient calculated in implicit mode in weighted motion prediction is based on the assumption that the brightness variation between the encoding target frame and the two reference frames is linear, when temporal brightness variation over these three frames is non-linear, it becomes impossible to calculate an appropriate weight coefficient, and the prediction performance is degraded. Examples include a fade image where brightness varies nonlinearly, an image that contains a flash, etc.

Since weighted motion prediction in JSVC directly employs H.264/AVC weighted motion prediction, it faces the same problem.

In the technology disclosed in Patent Document 1, flag information must be transmitted for each small region, leading to a problem of degraded encoding performance. Furthermore, since brightness variation cannot be compensated in the small regions when there is a large amount of brightness variation in the small region and this diverges from the amount of overall brightness variation, this point also leads to a problem of degraded encoding performance.

The present invention has been realized in view of these circumstances and has as an object establishing, in spatial scalable encoding that includes a base layer having a lowest spatial resolution and one or more enhancement layers having a higher spatial resolution, a method of designing a scalable encoder and decoder that generate a weight coefficient for weighted motion prediction based on information relating to temporal brightness variation between a decoded signal of a reference frame for motion prediction and a decoded signal of an immediately-lower layer of an encoding target frame, and, without transmitting weight coefficient information, perform weighted motion prediction using a same weight coefficient at the encoder and the decoder.

Means for Solving the Problem (1) Configuration of Video Scalable Encoding Apparatus of the Invention To achieve the above objects, the video scalable encoding apparatus of the present invention employs a configuration which calculates a weight coefficient which includes a proportional coefficient and an offset coefficient and indicates brightness variation between an encoding target image region and a reference image region in an upper layer, calculates a motion vector by applying the weight coefficient to an image signal of a reference image region as a search target and executing motion estimation, and generates a prediction signal by applying the weight coefficient to a decoded signal of a reference image region indicated by the motion vector and executing motion compensation. The video scalable encoding apparatus includes: (i) a determining device that, based on encoding information of an immediately-lower image region in an immediately-lower layer, which is present at spatially the same position as the encoding target image region, determines a data structure of the weight coefficient, and (ii) a calculating device that, when the immediately-lower image region performed interframe prediction in the immediately-lower layer, identifies an immediately-lower layer reference image region that the immediately-lower image region used as a prediction reference for motion prediction, and calculates the weight coefficient by applying a weight coefficient that the immediately-lower image region used in weighted motion prediction to a DC (direct current) component of an image region in the upper layer, which is present at spatially the same position as the immediately-lower layer reference image region, and assuming a result of the application as a DC component of the immediately-lower image region.

When there is one reference image region, and the determining device is employing a weight coefficient calculating method using proportional coefficient correction, there are cases where the determining device decides to use the ratio between the DC component of the reference image region and the DC component of the immediately-lower image region as the proportional coefficient, and decides to use zero as the offset coefficient, and determines the data structure of the weight coefficient in this manner.

Furthermore, when there is one reference image region, and the determining device is employing a weight coefficient calculating method using offset coefficient correction, there are cases where the determining device decides to use the difference between the DC component of the reference image region and the DC component of the immediately-lower image region as the offset coefficient, and decides to use 1 as the proportional coefficient, and determines the data structure of the weight coefficient in this manner.

Furthermore, when there are two reference image regions, there are cases where the determining device decides to use a value calculated as the proportional coefficient in accordance with the inter-frame distance between the encoding target image region and each reference image region, decides to use a value calculated as the offset coefficient by subtracting a value, which is obtained by multiplying each DC component of the two reference image regions by the corresponding proportional coefficient, from the DC component of the immediately-lower image region, and determines the data structure of the weight coefficient in this manner.

In employing this configuration, when attempting to increase precision by taking into consideration the prediction residual signal of the motion prediction generated in the immediately-lower image region, the calculating device can (i) add a DC component of the prediction residual signal of motion prediction generated in the immediately-lower image region to a value obtained by applying the weight coefficient that the immediately-lower image region used in the weighted motion prediction to the DC component of the image region in the upper layer, which is present at spatially the same position as the immediately-lower layer reference image region, and (ii) assume a result of the addition as the DC component of the immediately-lower image region.

In employing this configuration, when the motion prediction of the immediately-lower image region was performed in small region units that are smaller than the immediately-lower image region, the calculating device can calculate a DC component for each small region so as to obtain the relevant DC component, and, based on those calculated DC components and the areas of the respective small regions, can calculate a DC component regarded as the relevant DC component.

The video scalable encoding method of the invention realized by the functions of the processing devices described above can also be realized by a computer program. The computer program is stored in an appropriate computer-readable recording medium or supplied via a network, and, when implementing the invention, the program is installed and operated in control device such as a CPU, whereby the invention is realized.

(2) Configuration of Video Scalable Decoding Apparatus of the Invention

To achieve the above objects, the video scalable decoding apparatus of the invention employs a configuration which calculates a weight coefficient which includes a proportional coefficient and an offset coefficient and indicates brightness variation between a decoding target image region and a reference image region indicated by a decoded motion vector in an upper layer, and executes motion compensation by applying the weight coefficient to a decoded signal of the reference image region indicated by the decoded motion vector, and thereby generates a prediction signal. The video scalable decoding apparatus includes:

(i) a determining device that, based on encoding information of an immediately-lower image region in an immediately-lower layer, which is present at spatially the same position as the encoding target image region, determines a data structure of the weight coefficient, and (ii) a calculating device that, when the immediately-lower image region performed inter-frame prediction in the immediately-lower layer, identifies an immediately-lower layer reference image region that the immediately-lower image region used as a prediction reference for motion prediction, and calculates the weight coefficient by applying a weight coefficient that the immediately-lower image region used in weighted motion prediction to a DC (direct current) component of an image region in the upper layer, which is present at spatially the same position as the immediately-lower layer reference image region, and assuming a result of the application as a DC component of the immediately-lower image region.

When there is one reference image region, and the determining device is employing a weight coefficient calculating method using proportional coefficient correction, there are cases where the determining device decides to use the ratio between the DC component of the reference image region and the DC component of the immediately-lower image region as the proportional coefficient, and decides to use zero as the offset coefficient, and determines the data structure of the weight coefficient in this manner.

Furthermore, when there is one reference image region, and the determining device is employing a weight coefficient calculating method using offset coefficient correction, there are cases where the determining device decides to use the difference between the DC component of the reference image region and the DC component of the immediately-lower image region as the offset coefficient, and decides to use 1 as the proportional coefficient, and determines the data structure of the weight coefficient in this manner.

Furthermore, when there are two reference image regions, there are cases where the determining device decides to use a value calculated as the proportional coefficient in accordance with the inter-frame distance between the encoding target image region and each reference image region, decides to use a value calculated as the offset coefficient by subtracting a value, which is obtained by multiplying each DC component of the two reference image regions by the corresponding proportional coefficient, from the DC component of the immediately-lower image region, and determines the data structure of the weight coefficient in this manner.

In employing this configuration, when attempting to increase precision by taking into consideration the prediction residual signal of the motion prediction generated in the immediately-lower image region, the calculating device can (i) add a DC component of the prediction residual signal of motion prediction generated in the immediately-lower image region to a value obtained by applying the weight coefficient that the immediately-lower image region used in the weighted motion prediction to the DC component of the image region in the upper layer, which is present at spatially the same position as the immediately-lower layer reference image region, and (ii) assume a result of the addition as the DC component of the immediately-lower image region.

In employing this configuration, when the motion prediction of the immediately-lower image region was performed in small region units that are smaller than the immediately-lower image region, the calculating device can calculate a DC component for each small region so as to obtain the relevant DC component, and, based on those calculated DC components and the areas of the respective small regions, can calculate a DC component regarded as the relevant DC component.

The video scalable decoding method of the invention realized by the functions of the processing devices described above can also be realized by a computer program. The computer program is stored in an appropriate computer-readable recording medium or supplied via a network, and, when implementing the invention, the program is installed and operated in control device such as a CPU, whereby the invention is realized.

Effects of the Invention

According to the present invention, even when brightness varies in a part of an image due to the shadow of a moving object or the like, it becomes possible to reduce memory and calculation time required for the decoding process, while executing highly precise weighted motion prediction in implicit mode, which does not transmit the weight coefficient.

Also according to the present invention, even in uni-directional prediction such as L0/L1 prediction in P slice and B slice, which hitherto tolerated only explicit mode, it then becomes possible to reduce memory and calculation time required for the decoding process, while executing highly precise weighted motion prediction in implicit mode, which does not transmit the weight coefficient.

Also according to the present invention, even in images having nonlinear brightness variation between the encoding/decoding target frame and a plurality of prediction reference frames, such as images including a flash and nonlinear fade images, it then becomes possible to reduce memory and calculation time required for the decoding process, while executing highly precise weighted motion prediction in implicit mode, which does not transmit the weight coefficient.

Due to such enhancements in the weighted motion prediction performance, according to the invention, increased encoding efficiency is anticipated.

REFERENCE NUMERALS

| | |
|---|---|
| 101 | Prediction method determining unit |
| 102 | Intra predictor |
| 103 | Unweighted motion predictor |
| 104 | Inter-layer predictor |
| 105 | Weighted motion estimator |
| 106 | Weighted motion compensator |
| 107 | Prediction residual signal generator |
| 108 | Prediction residual signal encoder |
| 109 | Decoder |
| 110 | Relevant enhancement layer decoded signal storage unit |
| 111 | Immediately-lower layer encoding information storage unit |
| 201 | Prediction mode decoder |
| 202 | Prediction mode storage unit |
| 203 | Prediction method determining unit |
| 204 | Intra predictor |
| 205 | Unweighted motion predictor |
| 206 | Inter-layer predictor |
| 207 | Motion vector information decoder |
| 208 | Motion vector infoimation storage unit |
| 209 | Weighted motion compensator |
| 210 | Immediately-lower layer encoding information storage unit |
| 211 | Residual signal decoder |
| 212 | Residual signal storage unit |
| 213 | Decoded signal generator |
| 214 | Relevant enhancement layer decoded signal storage unit |

BEST MODE FOR CARRYING OUT THE INVENTION

Firstly, a summary of the present invention will be explained.

In this explanation, for sake of convenience, image regions are indicated as blocks, and DC (direct current) components of the image regions are indicated by average values.

Implicit mode is a method of indirectly calculating a weight coefficient required in weighted motion prediction, without transmitting additional encoding information. Provided that the calculated weight coefficient adequately represents brightness variation, this is a remarkably effective method. However, if the calculated weight coefficient diverges from the brightness variation, prediction performance is degraded.

Figure 1A:
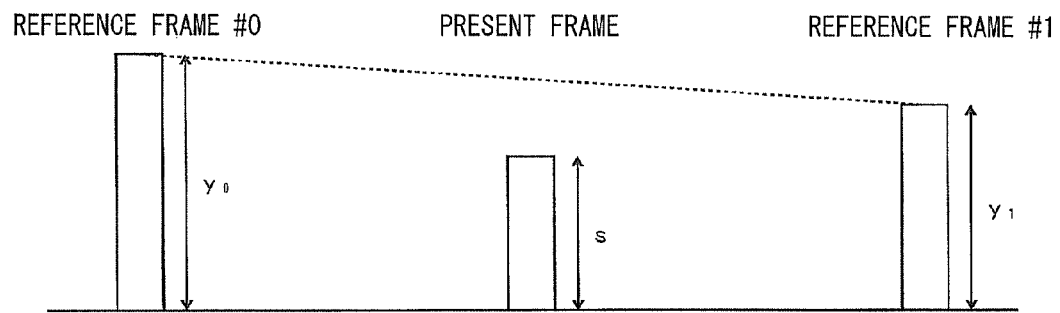
FIG. 1A An explanatory diagram of brightness variation between frames.

As shown in FIG. 1A, in the case of nonlinear fade images or flash images, brightness variation between frames is nonlinear.

Figure 1B:
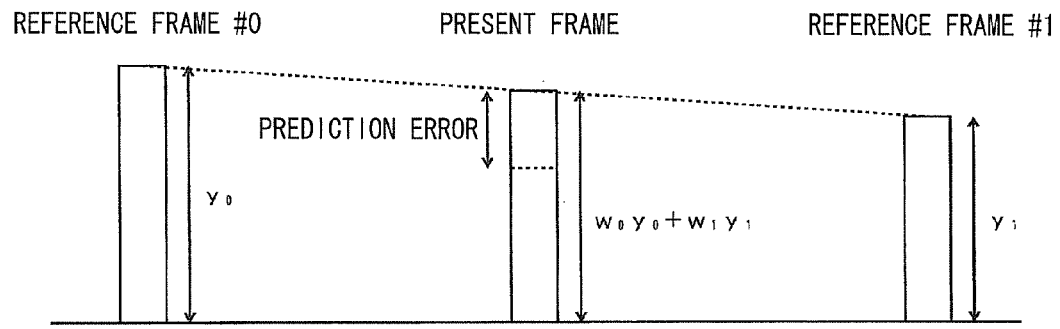
FIG. 1B A diagram of an example of degraded prediction performance.

In such cases, if linear prediction is performed using only a weight coefficient for a prediction reference signal, as shown in FIG. 1B, prediction performance will be degraded.

Accordingly, in weighted motion prediction in bi-prediction, an offset coefficient d is provided, while in the implicit mode of JVSC, since this offset coefficient is set at zero, the divergence amount itself is expressed as the prediction residual.

On the other hand, when $s^{mn}$ represents an original signal at coordinates (m, n) in an encoding target block with a size of M×N, $y_0^{mn}$ and $y_1^{mn}$ represent decoded signals at coordinates (m,n) in two reference blocks in bi-prediction, and a weight coefficient ($w_0$, $w_1$, d) is assigned to the encoding target block, the difference "e" between a weighted motion prediction signal calculated using the weight coefficient ($w_0$, $w_1$, d) and the original signal is:

$$e^{mn} = s^{mn} - (w_0 y_0^{mn} + w_1 y_1^{mn} + d)$$

and thus the total energy E of the prediction difference $e^{mn}$ in the encoding target block is:

$$E = \Sigma_m \Sigma_n (s^{mn} - (w_0 y_0^{mn} + w_1 y_1^{mn} + d))^2$$

Figure 20:
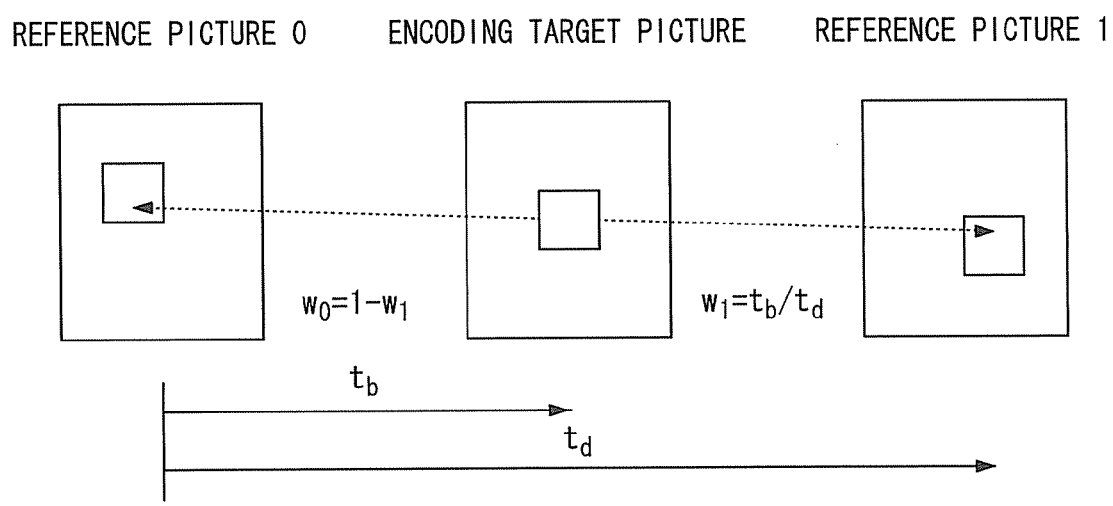
FIG. 20 An explanatory diagram of weighted motion prediction in H.264/AVC.

If $w_0$ and $w_1$ are applied in the same manner as FIG. 20, an offset coefficient d to minimize the total energy E can be determined by solving "$\partial E / \partial d = 0$" and determining:

$$d = <s> - w_0 <y_0> - w_1 <y_1>$$

<s>: Average value of original signal of encoding target block

<$y_0$>: Average value of decoded signal of reference block

<$y_1$>: Average value of decoded signal of reference block.

Figure 1C:
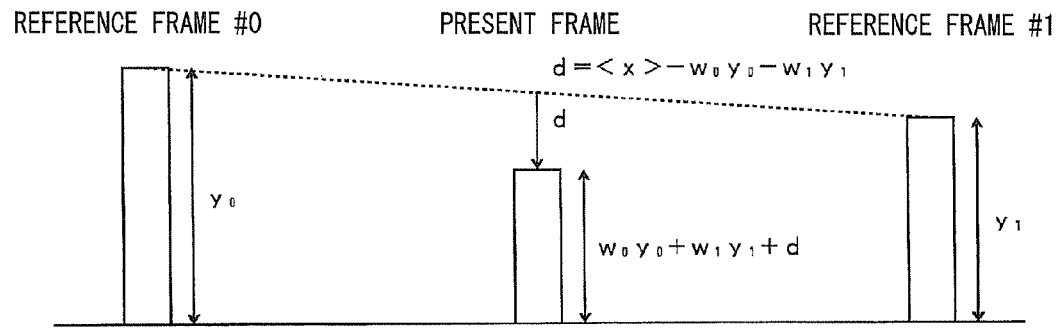
FIG. 1C An explanatory schematic diagram of the invention.

However, a decoder cannot refer to an original signal. Accordingly, the present invention focuses on the preservability of an interlayer average value. As shown in FIG. 1C, instead of the average value <s> of the original signal, the invention uses an average value <x> of a decoded signal of a block (immediately-lower block) that is present in spatially the same position as that of the encoding target block in an immediately-lower layer, and determines the offset coefficient d as:

$$d \approx \langle x \rangle - w_0 \langle y_0 \rangle - w_1 \langle y_1 \rangle$$

However, to determine the average value $\langle x \rangle$ of the decoded signal of the immediately-lower block present in spatially the same position as that of the encoding target block in the immediately-lower layer, all decoded signals of the immediately-lower layer must be decoded. This requires a large-capacity memory and a lengthy calculation time.

In the present invention, in weighted motion prediction in bi-prediction, when determining the offset amount in compliance with the calculation equation $$d \approx \langle x \rangle - w_0 \langle y_0 \rangle - w_1 \langle y_1 \rangle$$

the immediately-lower layer reference block, which the immediately-lower block used as a prediction reference for motion prediction, is identified, and $\langle x \rangle$ is determined by obtaining the result of application of the weight coefficient that the immediately-lower block used in weighted motion prediction to the average value of decoded signals of the block in the upper layer present in spatially the same position as that of the immediately-lower layer reference block, and assuming the result as the average value of decoded signals of the immediately-lower block.

The immediately-lower layer reference block that the immediately-lower block used as the prediction reference destination of motion prediction can be identified without decoding all the signals of the immediately-lower layer, by decoding a part of the information, such as a motion vector or the like. Therefore, according to the present invention, there is no problem of requiring a large-capacity memory and a lengthy calculation time.

The weight coefficients $w_0$ and $w_1$ can be determined on the decoding side by calculating them in accordance with the inter-frame distance between the encoding target block and each reference block. Moreover, the offset coefficient d can also be determined on the decoding side by calculating it from the decoded signal. Consequently, according to the invention, there is no need to transmit the weight coefficients to the decoding side.

Therefore, according to the invention, in weighted motion prediction in bi-prediction, even when brightness between frames varies nonlinearly while implementing implicit mode, highly precise weighted motion prediction can be achieved with a small memory capacity and in a short time.

The technical idea of the invention can also be applied in weighted motion prediction in uni-directional prediction.

That is, in weighted motion prediction in uni-directional prediction:

(i) As the proportional coefficient, the ratio between the average value of the decoded signal of the reference block and the average value of the original signal of an encoding target block is used, and an offset coefficient of zero is used; or (ii) As the offset coefficient, the difference between the average value of the decoded signal of the reference block and the average value of the decoded signal of the encoding target block is used, and 1 is used as the proportional coefficient.

However, a decoder cannot refer to an original signal. Accordingly, the present invention focuses on the preservability of an interlayer average value, and, instead of the average value of the original signal of the encoding target block, uses the average value of the decoded signal of the immediately-lower block to determine the ratio and difference mentioned above.

However, to determine the average value of the decoded signal of the immediately-lower block, all decoded signals of the immediately-lower layer must be decoded. This requires a large-capacity memory and a lengthy calculation time.

Accordingly in the invention, in uni-directional weighted motion prediction, the immediately-lower layer reference block, which the immediately-lower block used as a prediction reference destination for motion prediction, is identified, and the abovementioned ratio and difference are calculated by obtaining the result of application of the weight coefficient that the immediately-lower block used in weighted motion prediction to the average value of decoded signals of the block in the upper layer present in spatially the same position as that of the immediately-lower layer reference block, and assuming the result as the average value of decoded signals of the immediately-lower block.

The immediately-lower layer reference block, which the immediately-lower block used as the prediction reference destination for motion prediction, can be identified without decoding all the signals of the immediately-lower layer by decoding a part of the information, such as a motion vector. Hence, according to the invention, there are no problems of requiring a large-capacity memory and a lengthy calculation time.

This enables the weight coefficients to be determined on the decoding side by calculating them from the decoded signal, and consequently, according to the invention, there is no need to transmit the weight coefficients to the decoding side.

Therefore, according to the invention, in weighted motion prediction in uni-directional prediction, even when brightness between frames changes nonlinearly while implementing implicit mode, highly precise weighted motion prediction can be achieved with a small memory capacity and in a short time.

Subsequently, the invention will be explained in detail with reference to exemplary embodiments.

As mentioned earlier, weighted motion prediction in H.264/AVC is executed in slice units. Therefore, when there is brightness variation in part of a slice, or when brightness variation is non-uniform within the slice, the prediction performance of the weighted motion prediction is degraded. An example is the brightness variation caused by the shadow of a moving object. Since JSVC inherits weighted motion prediction in H.264/AVC, it faces the same problem.

If it is attempted to perform weighted motion prediction by calculating weight coefficients in units smaller than slices, such as macroblocks, the encoding amount needed for the weight coefficient in explicit mode will be extremely large. In such cases, the weight coefficients are preferably calculated in implicit mode. However, as explained above, the implicit mode of weighted motion prediction in H.264/AVC is limited to bi-prediction in B slices.

Furthermore, since a weight coefficient calculated in implicit mode in weighted motion prediction is based on the assumption that the brightness variation across the encoding target frame and the two reference frames is linear, when temporal brightness variation over these three frames is nonlinear, it becomes impossible to calculate an appropriate weight coefficient, and the prediction performance is degraded. Examples include a fade image where brightness varies nonlinearly, an image that contains a flash, etc. Since weighted motion prediction in JSVC implements H.264/AVC weighted motion prediction without any modification, it faces the same problem.

In view of such circumstances, the inventors previously filed an application for Japanese Patent Application No. 2007-174161 (filed Jul. 2, 2007) for a new invention that can solve these problems.

The invention filed in JP 2007-174161 calculates a weight coefficient by using the decoded signal of an immediately-lower layer of the encoding target frame.

Subsequently, a weight coefficient calculating method introduced by the invention filed in JP 2007-174161 will be explained.

The invention filed in JP 2007-174161 employs the following procedure to calculate a weight coefficient for use in weighted motion estimation and weighted motion compensation for scalable encoding.

In conventional implicit mode, temporal brightness variation is estimated by interpolation or extrapolation within one layer in accordance with the distance from a reference frame, and the weight coefficient is calculated.

In the invention (Japanese Patent Application No. 2007-174161), the temporal brightness variation is estimated more precisely by using information relating to the decoded signal of an immediately-lower layer of the layer to be encoded/decoded.

Symbols used in the explanation of the procedure will be explained.

Let f be an encoding/decoding process target frame (hereinafter, correction target frame) of the enhancement layer, $f_0$ be a weighted motion estimation/compensation reference frame (hereinafter, corrected frame) in L0 prediction in P slice or B slice, and $f_1$ be a corrected frame of L1 prediction in B slice. A frame in the immediately-lower layer at the same time as the correction target frame f is denoted as g.

A prediction signal value inserted at coordinates (i, j) of an encoding/decoding process target block (hereinafter, correction target block) in frame f is denoted as $z(i,j)$, and a decoded signal value at coordinates (i, j) of a weighted motion estimation/compensation reference block (hereinafter, corrected block) in frame $f_0$ is denoted as $y_0(i, j)$. Furthermore, a decoded signal value at coordinates (i, j) of a block in frame g present in spatially the same position as that of the correction target block of frame f is denoted as $x(i, j)$.

Figure 2:
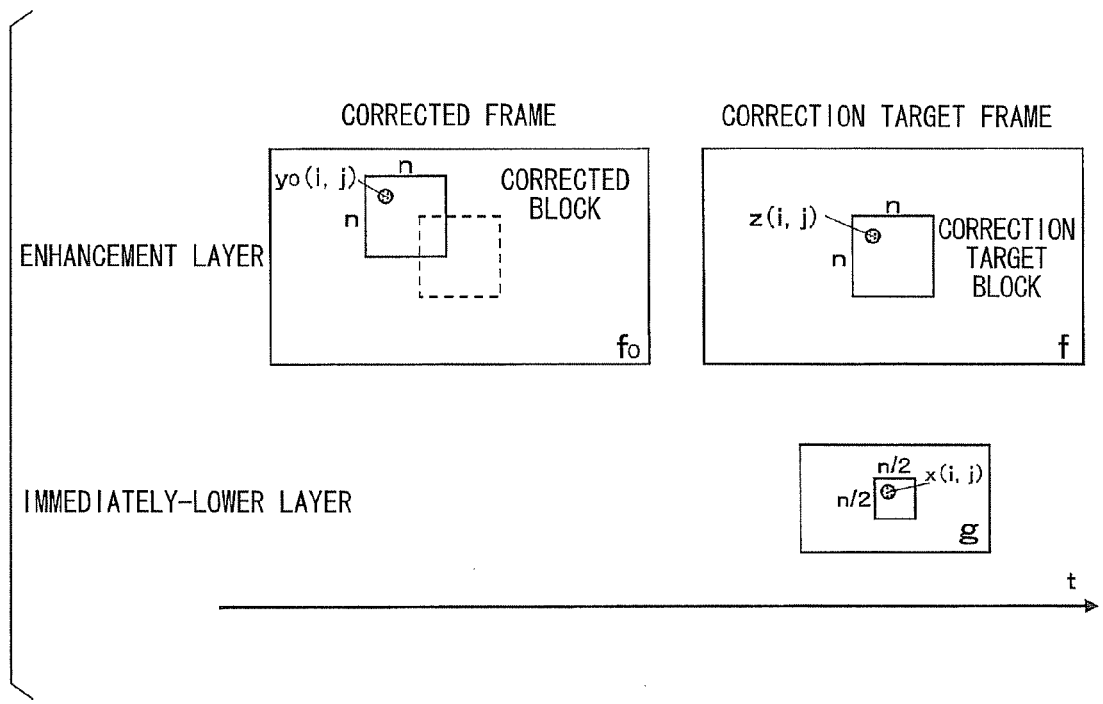
FIG. 2 An explanatory diagram of a correction target frame and a corrected frame.

This is shown in FIG. 2. FIG. 2 is a diagram when the resolution ratio between the relevant enhancement layer and the immediately-lower layer is 2:1 on both horizontal and vertical axes. A similar process can be performed for resolution ratios other than 2:1.

Let $Y_0$ be a DC component value of a corrected block in frame $f_0$, and X be a DC component value of a block in frame g present at spatially the same position as that of a correction target block of frame f. In the case of FIG. 2, these are calculated as follows.

$$Y_0 = \frac{1}{n^2} \sum_{i=0}^{n-1} \sum_{j=0}^{n-1} y_0(i,j) \quad (1)$$

$$X = \frac{1}{\left(\frac{n}{2}\right)^2} \sum_{i=0}^{\frac{n}{2}-1} \sum_{j=0}^{\frac{n}{2}-1} x(i,j) \quad (2)$$

Method of Calculating Weight Coefficients in P Slice and L0/L1 Prediction in B Slice In single-frame prediction such as P slice and L0/L1 prediction performed in B slice, the prediction signal value $z(i,j)$ is calculated as follows.

For P slice and L0 prediction in B slice:

$$z(i,j) = w_0 \cdot y_0(i,j) + d_0$$

For L1 prediction in B slice:

$$z(i,j) = w_1 \cdot y_1(i,j) + d_1 \quad (3)$$

The invention (JP 2007-174161) describes two examples of methods of calculating these weight coefficients $w_0$ and $d_0$, or $w_1$ and $d_1$.

The following explanation of calculating methods describes examples in P slice and L0 prediction in B slice. For L1 prediction in B slice, elements relating to frames $f_0$ and $g_0$ can be replaced with elements relating to frames $f_1$ and $g_1$.

The two calculating methods are based on the following assumption. Since frame f and frame g are composed of same-time information, we can expect their signals to have similar brightness. Using brightness information of frame g, which is already known, brightness variation of the correction target frame f is predicted indirectly from the corrected frame $f_0$.

Method 1-1: Proportional Coefficient Correction Using DC Component in Single-Frame Prediction In this method, the weight coefficients are calculated as follows.

$$w_0 = X/Y_0 \quad (4)$$

$$d_0 = 0 \quad (5)$$

Method 1-2: Offset Coefficient Correction Using DC Component in Single-Frame Prediction In this method, the weight coefficients are calculated as follows.

$$w_0 = 1 \quad (6)$$

$$d_0 = X - Y_0 \quad (7)$$

Method of Calculating Weight Coefficient in Bi-Prediction in B Slice

In bi-prediction in B slice, the prediction signal value $z(i,j)$ is calculated as follows.

$$z(i,j) = w_0 \cdot y_0(i,j) + w_1 \cdot y_1(i,j) + d \quad (8)$$

In the invention (JP 2007-174161), the weight coefficients $w_0$, $w_a$, and d are calculated as follows.

The calculating method is based on the assumption that, since frame f and frame g are composed of same-time information, their signals have similar brightness. Using brightness information of frame g, which is already known, brightness variation of the correction target frame f is predicted indirectly from corrected frames $f_0$ and Method 2-1: Weight coefficient correction Using DC Component Block in Bi-Prediction In this method, the weight coefficients are calculated as follows.

$$w_0 = 1 - w_1 \quad (9)$$

$$w_1 = t_b / t_d \quad (10)$$

$$d = X - w_0 \cdot Y_0 - w_1 \cdot Y_1 \quad (11)$$

where $t_b$ is the inter-frame distance from the corrected frame $f_0$ to the correction target frame, and $t_d$ is the inter-frame distance from the corrected frame $f_0$ to the corrected frame $f_1$.

There follows a summary of the methods of calculating weight coefficients introduced by the invention filed in Japanese Patent 2007-174161 as described above.

Figure 3:
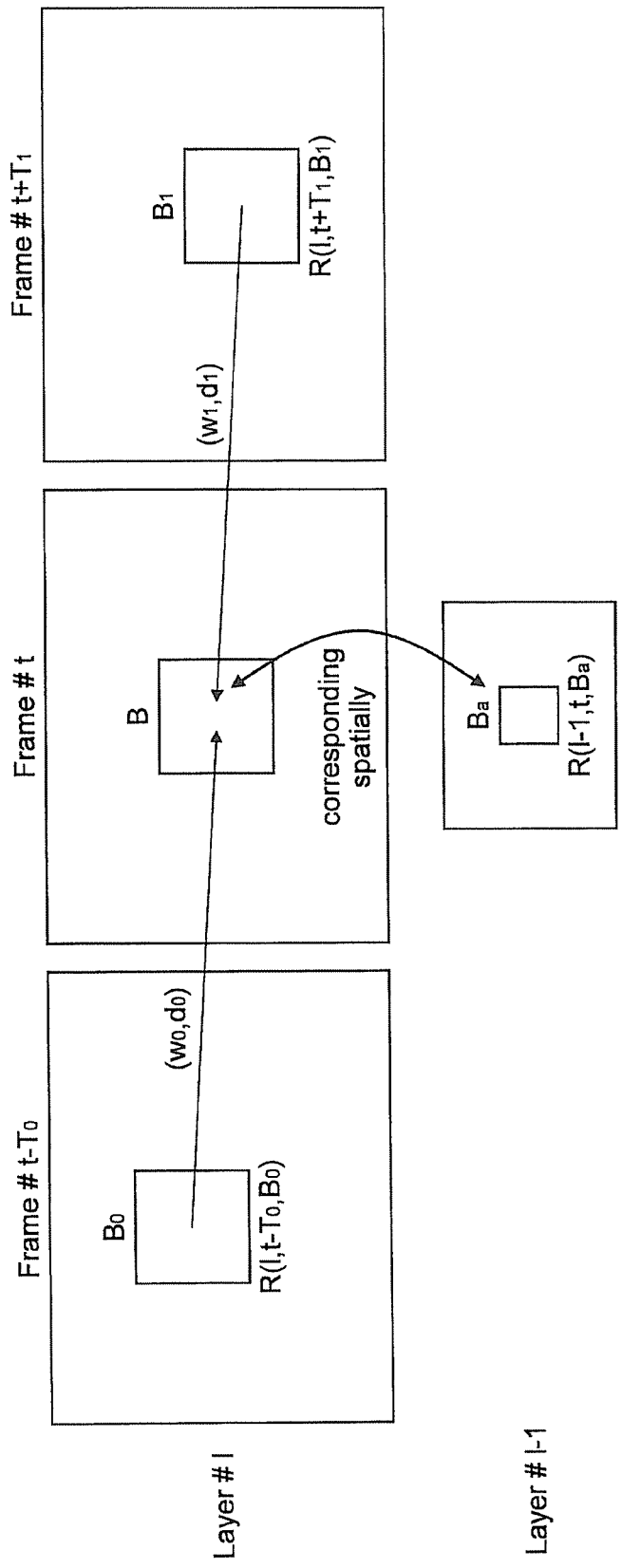
FIG. 3 An explanatory diagram of a method of calculating a weight coefficient in an invention of Japanese Patent Application No. 2007-174161.

As shown in FIG. 3, let B represent the block of a frame at time t in the relevant layer l, and let $B_0$ and $B_1$ respectively represent reference blocks therefor. $B_0$ and $B_1$ respectively belong to a frame at time $t-T_0$ and a frame at time $t+T_1$ in layer l.

Let us suppose that the frame at time $t-T_0$ is the only reference frame in uni-directional prediction.

Also, let $B_a$ be a block of the frame at time t in spatially the same position as that of block B in an immediately-lower layer l−1. Hereinafter, $B_a$ is termed "immediately-lower block".

Let $R(l, t-T_0, B_0)$ be the DC component of the decoded signal in reference block $B_0$, $R(l, t+T_1, B_1)$ be the DC component of the decoded signal in reference block $B_1$, and let $R(l-1, t, B_a)$ be the DC component of the decoded signal in the immediately-lower block $B_a$.

The DC component of each block is generated by applying a two-dimensional FFT or a two-dimensional DCT to the pixel set in that block.

The invention filed in JP 2007-174161 defines the weight coefficients $(w_0, d_0)$ or $(w_0, w_1, d)$ at this time as follows.
For Uni-Directional Prediction:
Proportional Coefficient Correction: Correcting method using Formulas (4) and (5)

$$w_0 = R(l-1,t,B_a)/R(l,t-T_0,B_0)$$

$$d_0 = 0 \quad (12)$$

or

Offset Coefficient Correction: Correcting method using Formulas (6) and (7)

$$w_0 = 1$$

$$d_0 = R(l-1,t,B_a)/R(l,t-T_0,B_0) \quad (13)$$

For Bi-Prediction:
Correcting Method using Formlas (9) to (11)

$$w_0 = 1 - w_1$$

$$w_1 = T_0/(T_0+T_1)$$

$$d = R(l-1,t,B_a) - w_0 \cdot R(l,t-T_0,B_0) - w_1 \cdot R(l,t+T_1,B_1) \quad (14)$$

Thus, weighted motion prediction in implicit mode which does not transmit information relating to weight coefficients can be implemented by means of uni-directional prediction. There are two types of method for calculating weight coefficients in the uni-directional prediction: the proportional coefficient correcting method given in Formula (12) and the offset coefficient correcting method given in Formula (13).

Moreover, prediction performance in implicit mode during bi-prediction in H.264/AVC is enhanced in the manner given in Formula (14).

In regard to the invention according to Formula (14), the inventors published 'Kazuya Hayase, Yukihiro Bandoh, Seishi Takamura, Kazuto Karnikura, and Yoshiyuki Yashima: "Weighted Prediction of Spatial Scalable Video Coding using Inter-Layer Correlation" FIT 2007, Sixth Forum on Information Science and Technology, pp. 253-256, September 2007'.

Figure 4A:
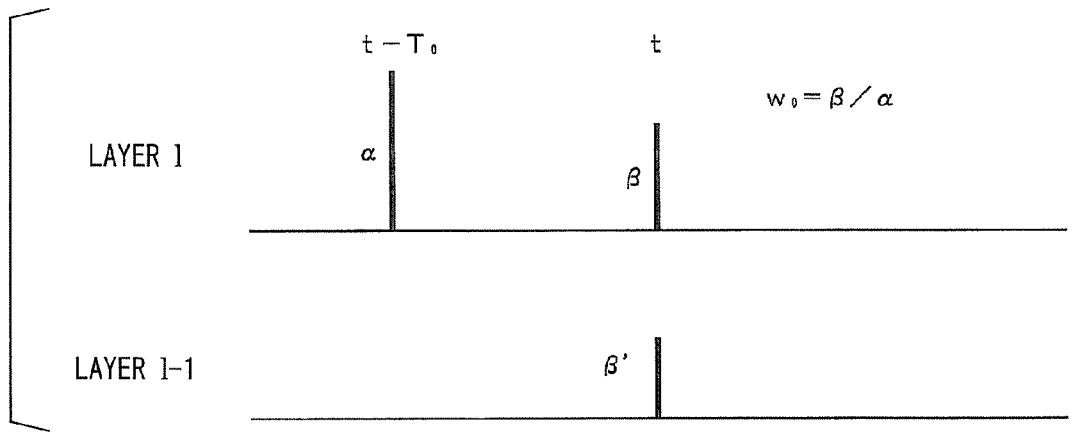
FIG. 4A An explanatory diagram of a method of calculating a weight coefficient in the invention of Japanese Patent Application No. 2007-174161.

Correction of the proportional coefficient in uni-directional prediction which determines the weight coefficients $(w_0, d_0)$ in compliance with Formula (12) will be explained in brief. As shown in FIG. 4A, in the determination of the weight coefficient $w_0$ to be the ratio between the DC component a of the decoded signal at time $t-T_0$ in layer l and the DC component β of the original signal at time t in layer l, the DC component β of the original signal at time t in layer l is replaced by a DC component β' of the decoded signal at time t in layer l−1, and the result is deemed to be the weight coefficient $w_0$.

A characteristic feature here is that, since the weight coefficient $w_0$ can be calculated from the decoded signal, it need not be transmitted to the decoding side.

Figure 4B:
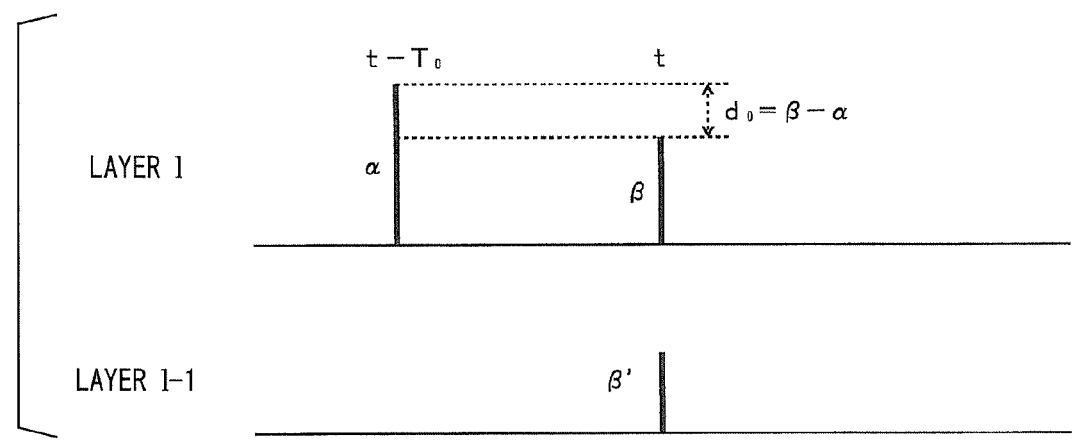
FIG. 4B Similarly, an explanatory diagram of a method of calculating a weight coefficient in the invention of Japanese Patent Application No. 2007-174161.

Correction of the offset coefficient in uni-directional prediction which determines the weight coefficients $(w_0, d_0)$ in compliance with Formula (13) will be explained in brief. As shown in FIG. 4B, in the determination of the offset coefficient $d_0$ to be the difference between the DC component β of the original signal at time t in layer l and the DC component a of the decoded signal at time $t-T_0$ in layer l, the DC component β of the original signal at time t in layer l is replaced by a DC component β' of the decoded signal at time t in layer l−1, and the result is deemed to be the offset coefficient $d_0$.

A characteristic feature here is that, since the offset coefficient $d_0$ can be calculated from the decoded signal, it need not be transmitted to the decoding side.

Figure 4C:
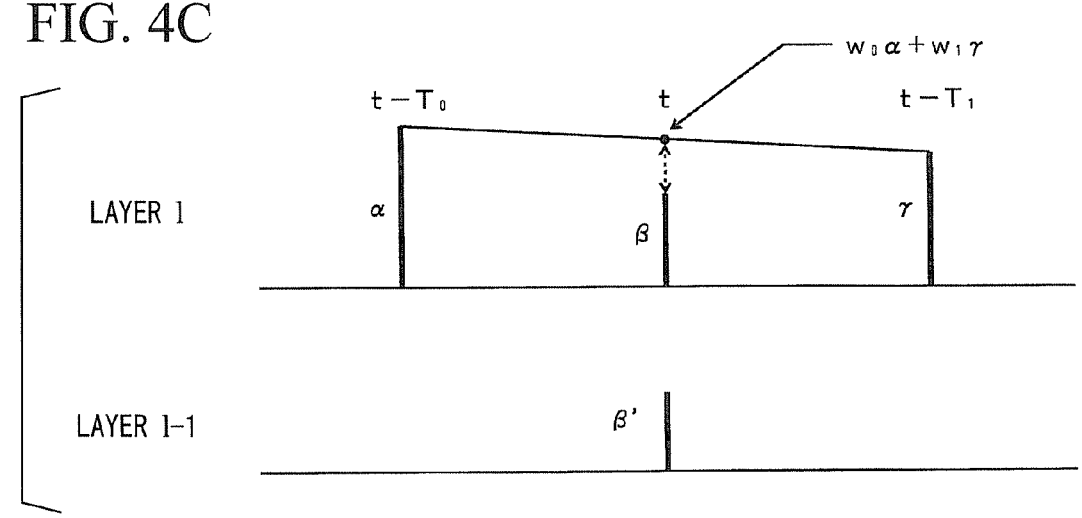
FIG. 4C Similarly, an explanatory diagram of a method of calculating a weight coefficient in the invention of Japanese Patent Application No. 2007-174161.

Correction of the offset coefficient in bi-prediction which determines the weight coefficients $(w_0, d_0)$ in compliance with Formula (14) will be explained in brief. As shown in FIG. 4C, if α represents the DC component of the decoded signal at time $t-T_0$ in layer l, β represents the DC component of the original signal at time t in layer l, and γ represents the DC component of the decoded signal at time $t+T_1$ in layer l, then in the determination of the offset coefficient d to be "$d = \beta - w_0 \cdot \alpha - w_1 \cdot \gamma$", the DC component β of the original signal at time t in layer l is replaced with a DC component β' of the decoded signal at time t in layer l−1, and the result is deemed to be the offset coefficient d.

A characteristic feature here is that, since the offset coefficient d can be calculated from the decoded signal, it need not be transmitted to the decoding side.

On the other hand, types of decoding of encoding processes that form multi-layers such as JSVC include multi-loop decoding, which requires inverse motion compensation in a lower layer, and single-loop decoding, which does not require inverse motion compensation in a lower layer. Generally, decoding processes need to be simple. For this reason, high-load inverse motion compensation is a process that should be avoided wherever possible, whereas single-loop decoding is in demand.

In this specification, "inverse motion compensation" denotes the processes as far as identifying the decoded signal of a block indicated by a motion vector.

However, in the invention filed in JP 2007-174161, as shown in Formula (2), the DC component $R(l-1, t, B_a)$ of the decoded signal in the immediately-lower block $B_a$ is calculated after all the decoded signals in the immediately-lower layer have been created. Consequently, the decoding process becomes one of multi-loop decoding, and room for improvement remains.

In view of such circumstances, the present invention has as an object establishing, in spatial scalable encoding that includes a base layer and one or more enhancement layers, a new method of designing a scalable encoder and decoder that estimates a DC component of a decoded signal in an immediately-lower layer of an encoding target frame from only a decoded signal of a motion prediction reference frame and encoding information relating to motion compensation in the immediately-lower layer, and generates a weighted motion prediction weight coefficient from the relationship between the calculated DC component of the decoded signal of the immediately-lower layer of the encoding target frame and the DC component of the decoded signal of the motion prediction reference frame, and thereby performs weighted motion prediction using the same weight coefficient at the encoder and the decoder without transmitting any weight coefficient information.

A procedure for weighted motion prediction in the invention will be explained.

Weighted motion prediction is composed of two steps: weighted motion estimation and weighted motion compensation.

Weighted motion estimation denotes a process of correcting the brightness variation between a process target frame and a motion prediction reference frame while searching for motion between the frames, and outputting motion information detected in the search as a motion vector.

Weighted motion compensation denotes a process of reading the motion information, correcting brightness variation with respect to a signal value indicated by the motion vector, and outputting the corrected signal value as a prediction signal in the process target frame.

In an encoding process, a motion vector is detected by weighted motion estimation, the motion vector is read, and weighted motion compensation is executed.

In a decoding process, the motion vector is read by decoding the encoding information, and weighted motion compensation is executed.

Weight coefficients can be calculated in arbitrary image region units. Examples include frame units, slice units, macroblock units, even smaller block units obtained by minutely dividing a macroblock, etc.

In the invention, since there is no need to transmit a weight coefficient for the layer concerned, the overhead required for weighted motion prediction is the same no matter which image region unit is used for calculation. Therefore, the smaller the image region unit used for calculating the weight coefficient, the greater the increase in weighted motion prediction performance.

The explanation will proceed by taking as an example a case where the weight coefficient is calculated in macroblock units. Weighted motion prediction by a similar process can also be performed using units other than macroblocks.

A similar process can be performed irrespective of the signal that is the target, such as for a luminance signal or a color signal.

Weighted Motion Estimation

Weighted motion estimation is accomplished by searching, for each macroblock of the encoding target frame, for a matching macroblock in the estimation reference frame.

During this search, every time a search target macroblock is changed, a weight coefficient indicating brightness variation between the blocks in both frames is calculated, and the decoded signal of the search target macroblock, which is corrected with that weight coefficient, is used as a comparative signal for match determination.

A macroblock that is determined to be matching becomes the reference for a motion vector, and is used as a reference macroblock in motion compensation.

One example of match determining means is the one mentioned in Non-Patent Document 1, which minimizes the Lagrange cost between the encoding amount and encoding distortion.

Weighted Motion Compensation

In weighted motion compensation, firstly, motion vector information held by each encoding/decoding target macroblock is read.

Subsequently, a weight coefficient that indicates the brightness variation between a reference macroblock indicated by that motion vector and the encoding/decoding target macroblock is calculated.

The decoded signal of the reference macroblock, which is corrected with the weight coefficient, is then used as a prediction signal in the encoding/decoding target macroblock.

Weight Coefficient Calculation Processing

Weight coefficients for use in scalable encoding weighted motion estimation and weighted motion compensation are typically calculated by the following procedure.

As in the invention filed in JP 2007-174161, for a block where uni-directional prediction is performed, the weight coefficient is calculated from Formula (12) or Formula (13) mentioned earlier, whereas where bi-prediction is performed, the weight coefficient is calculated from Formula (14) mentioned earlier.

However, the present invention employs a different method of determining the decoded signal DC component $R(l-1, t, B_a)$ of the immediately-lower block than that in the invention filed in JP 2007-174161.

That is, while the invention filed in JP 2007-174161 obtains the DC component by completely decoding and orthogonally converting the immediately-lower layer, in the present invention, the immediately-lower layer is only partially decoded (i.e., the level of decoding a part of the encoding information, rather than of decoding until the image signal is decoded), and the DC component is then obtained by indirect estimation from this partially decoded information and the decoded signal of the reference frame of the relevant layer.

Partial decoding eliminates the need to perform inverse motion compensation, and can shorten the decoding time.

Symbols used in an explanation of a specific procedure will be explained.

Figure 5:
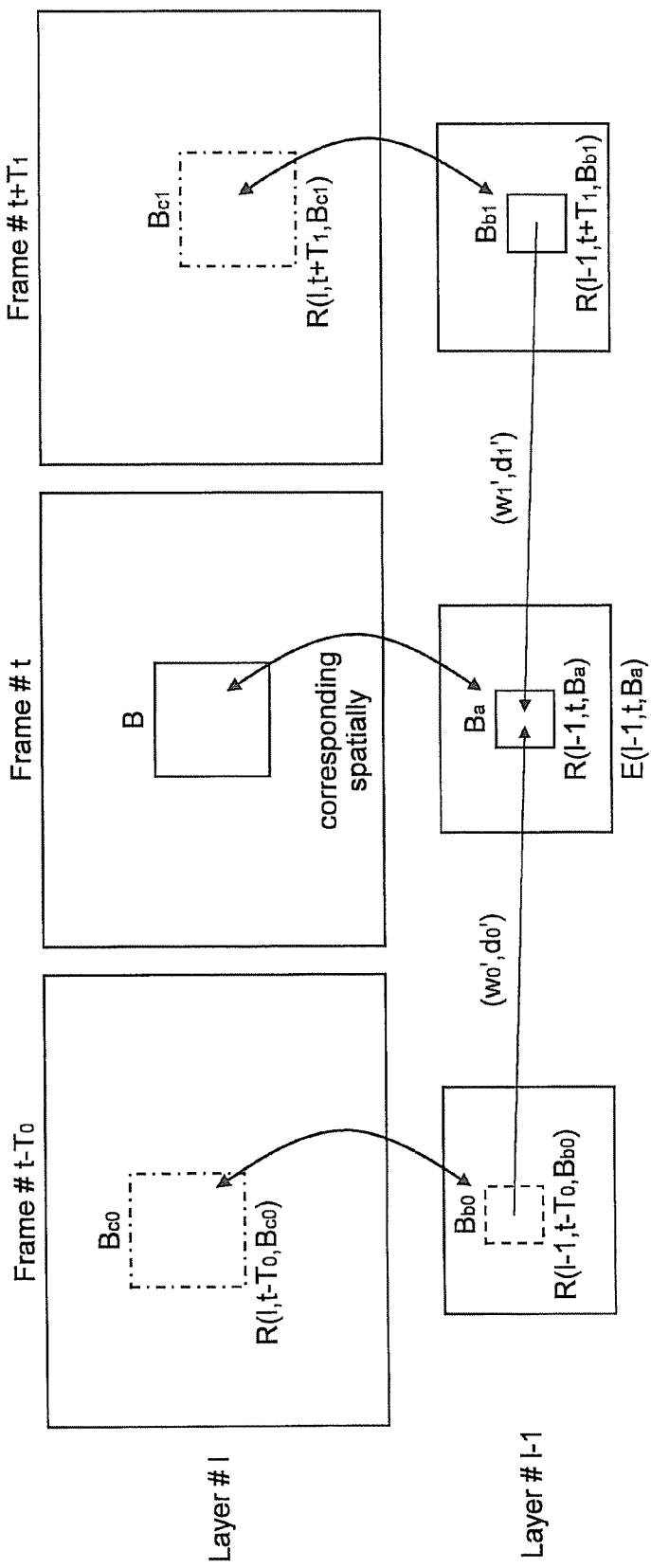
FIG. 5 An explanatory schematic diagram of the invention.

As shown in FIG. 5, let B be the relevant block of a frame at time t in layer l. Let $B_a$ be an immediately-lower block of the block B in an immediately-lower layer l-1.

Let $B_{b0}$ and $B_{b1}$ be motion prediction reference blocks of the immediately-lower block $B_a$, and let us assume that $B_{b0}$ and $B_{b1}$ respectively belong to a frame at time $t-T_0$ in layer l and a frame at time $t+T_1$ in layer l.

Positions of the reference blocks $B_{b0}$ and $B_{b1}$ in the immediately-lower layer l-1 are obtained by decoding encoding information about a reference frame index and a motion vector held by the immediately-lower block $B_a$.

Also, let $B_{c0}$ and $B_{c1}$ be blocks in layer l present in spatially the same positions as the reference blocks $B_{b0}$ and $B_{b1}$ in the immediately-lower layer l-1. Hereinafter, $B_{c0}$ and $B_{c1}$ are termed "immediately-upper blocks".

Let $R(l-1, t, B_a)$, $R(l-1, t-T_0, B_{b0})$, $R(l-1, t+T_1, B_{b1})$, $R(l, t-T_0, B_{c0})$, and $R(l, t+T_1, B_{c1})$ respectively be DC components of decoded signals in the blocks $B_a$, $B_{b0}$, $B_{b1}$, $B_{c0}$, and $B_{c1}$.

Let $E(l-1, t, B_a)$ be the DC component of a prediction residual signal contained in the immediately-lower block $B_a$. The DC component $E(l-1, t, B_a)$ of the prediction residual signal is obtained by decoding encoding information of a DC component of a prediction residual signal held by the immediately-lower block $B_a$.

When weighted motion prediction is performed in the immediately-lower layer, let $(w_0', d_0')$ be the weight coefficients between the immediately-lower block $B_a$ and the reference block $B_{b0}$, and let $(w_1', d_1')$ be the weight coefficients between the immediately-lower block $B_a$ and the reference block $B_{b1}$.

These weight coefficients $(w_0', d_0')$ and $(w_1', d_1')$ are obtained by decoding weight coefficient encoding information held by the immediately-lower block $B_a$.

In the present invention, while there is no need to encode the weight coefficient for layer l, whether there is a need to encode the weight coefficient of the immediately-lower layer l-1 depends on whether there is a layer below it.

For sake of convenience in this explanation, let us suppose that the weight coefficients $(w_0', d_0')$ and $(w_1', d_1')$ are obtained by decoding encoding information of weight coefficients held by the immediately-lower block $B_a$.

Subsequently, in regard to the prediction method for the immediately-lower block $B_a$, different methods of determining the DC component $R(l-1, t, B_a)$ of the decoded signal of the immediately-lower block $B_a$ will be explained in four separate cases: intra prediction, uni-directional prediction in interframe prediction, bi-prediction in interframe prediction, and a mixture of uni-directional prediction regions and bi-prediction regions in a block in interframe prediction.

(1) Immediately-Lower Block $B_a$ Performs Intra Prediction

When the immediately-lower block $B_a$ performs intra prediction, and the prediction is executed using constrained intra prediction, all decoded signals in the immediately-lower block $B_a$ can be reconstructed without performing inverse motion compensation.

Here, "constrained intra prediction" is used in H.264/AVC as described in Non-Patent Document 1 and in JSVC as described in Non-Patent Document 2, and is one type of intra prediction method having a constrain that, when there is no intra prediction mode in adjacent blocks, the block cannot employ intra prediction mode.

By using this method, a block that employs intra prediction mode can reconstruct the decoded signals in the block within the frame, rendering inverse motion compensation unnecessary.

Therefore, when the immediately-lower block $B_a$ performs intra prediction, and the prediction employs constrained intra prediction, all the decoded signals in the immediately-lower block $B_a$ are simply reconstructed, and a DC component is calculated on the basis of each signal value. If the intra prediction does not employ constrained intra prediction, the invention is not implemented.

(2) Immediately-Lower Block $B_a$ Performs Interframe Prediction Using Uni-Directional Prediction When the immediately-lower block $B_a$ uses uni-directional prediction, the decoded signal DC component $R(l-1, t, B_a)$ of the immediately-lower block $B_a$ can be estimated as follows.

$$R(l-1,t,B_a) \approx w_0' \cdot R(l-1,t-T_0,B_{b0}) + d_0' + E(l-1,t,B_a) \quad (15)$$

However, the information of $R(l-1, t-T_0, B_{b0})$ cannot be obtained without reconstituting all the decoded signals in the immediately-lower layer.

Accordingly, by assuming that:

$$R(l-1,t-T_0,B_{b0}) \approx R(l-1,t-T_0,B_{c0}) \quad (16)$$

the decoded signal DC component $R(l, t-T_0, B_{c0})$ of the immediately-upper block $B_{c0}$ (of block $B_{b0}$) in the relevant layer is used as a substitute.

Unless there is considerable quantization distortion in the decoded signal DC components of the relevant layer and the immediately-lower layer, the assumption of Formula (16) generally holds.

If frame $t-T_0$ in layer $l$ is the reference frame of the relevant frame $t$, the decoded signals of block $B_{c0}$ have been stored in a buffer for motion prediction.

Therefore, by using the values estimated, from Formula (16) to calculate the decoded signal DC component of the immediately-lower block $B_a$, weight coefficients can be calculated without performing inverse motion compensation in the immediately-lower layer.

Subsequently in the present invention, $R(l-1, t, B_a)$ is estimated from the following formula.

$$R(l-1,t,B_a) \approx w_0' \cdot R(l,t-T_0,B_{c0}) + d_0' + E(l-1,t,B_a) \quad (17)$$

It is possible here that the immediately-lower block $B_a$ includes a plurality of small blocks, which contain a plurality of motion vectors. For example, if the relevant block B has a size of 16×16, the size of immediately-lower block $B_a$ will be 8×8. JSVC permits the use of seven block sizes: 4×4, 4×8, 8×4, 8×8, 8×16, 16×8, and 16×16.

Therefore, when the immediately-lower block $B_a$ is size 8×8, it contains a maximum of four small blocks.

When the immediately-lower block $B_a$ contains a plurality of small blocks, the decoded signal DC component value in each small block is weighted in accordance with the area of the respective small block, and their sum total is deemed to be the decoded signal DC component $R(l-1, t, B_a)$ of the immediately-lower block $B_a$.

One example of a specific calculation procedure when the immediately-lower block includes a plurality of small blocks is explained below.

Figure 6:
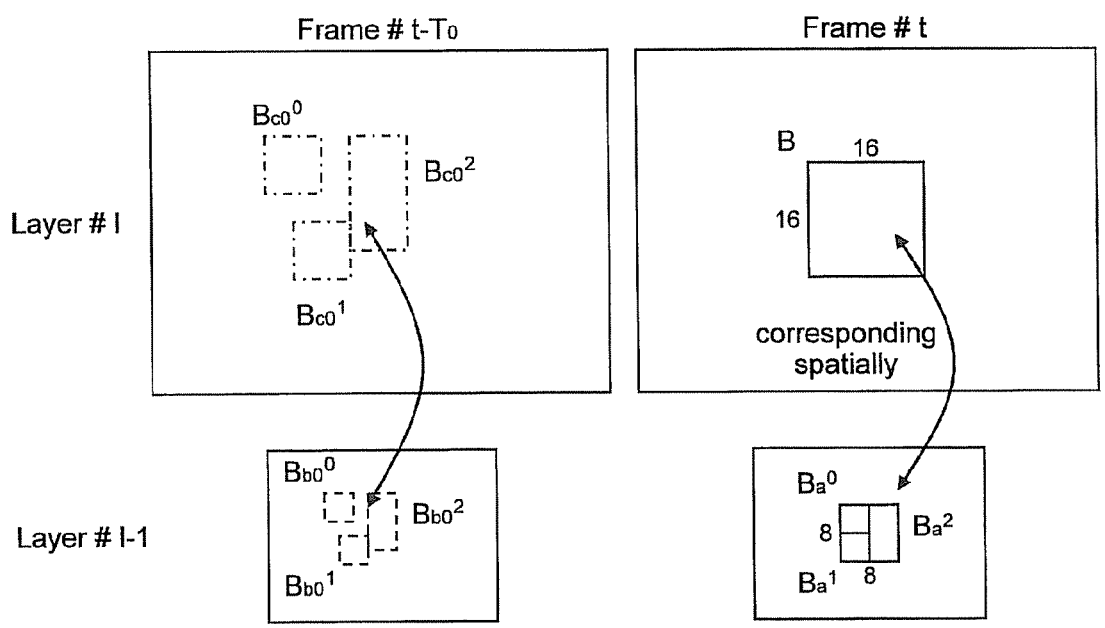
FIG. 6 Similarly, an explanatory schematic diagram of the invention.

As shown in FIG. 6, let us suppose that block B has a size of 16×16, and the immediately-lower block $B_a$ contains two small blocks sized 4×4 and one small block sized 4×8. These small blocks are denoted by $B_a^0$ and $B_a^1$ (4×4 blocks) and $B_a^2$ (4×8 block).

Furthermore, let $B_{b0}^0$, $B_{b0}^1$, and $B_{b0}^2$ respectively denote reference blocks for motion prediction of the small blocks $B_a^0$, $B_a^1$, and $B_a^2$, and let $B_{c0}^0$, $B_{c0}^1$, and $B_{c0}^2$ respectively denote immediately-upper blocks in the relevant layer at spatially the same positions as those reference blocks.

Let $(w_0^0, d_0^{0\prime})$, $(w_0^{1\prime}, d_0^{1\prime})$, and $(w_0^{2\prime}, d_0^{2\prime})$ be weight coefficients assigned respectively to the small blocks $B_a^0$, $B_a^1$, and $B_a^2$.

The decoded signal DC component $R(l-1, t, B_a)$ of the block $B_a$ is calculated as follows.

$$R(l-1,t,B_a) = \left(\frac{1}{4}\right) \cdot [w_0^{0\prime} \cdot R(l,t-T_0,B_{c0}^0) + d_0^{0\prime} + E(l-1,t,B_a^0)] + \quad (18)$$
$$\left(\frac{1}{4}\right) \cdot [w_0^{1\prime} \cdot R(l,t-T_0,B_{c0}^1) + d_0^{1\prime} + E(l-1,t,B_a^1)] +$$
$$\left(\frac{1}{2}\right) \cdot [w_0^{2\prime} \cdot R(l,t-T_0,B_{c0}^2) + d_0^{2\prime} + E(l-1,t,B_a^2)]$$

(3) Immediately-Lower Block $B_a$ Performs Interframe Prediction Using Bi-Prediction When the immediately-lower block $B_a$ uses bi-prediction, its decoded signal DC component $R(l-1, t, B_a)$ can be estimated as follows.

$$R(l-1,t,B_a) \approx w_{0'} \cdot R(l-1,t-T_0,B_{b0}) + \quad (19)$$
$$w_{1'} \cdot R(l-1,t+T_1,B_{b1}) + \left(\frac{1}{2}\right) \cdot (d_{0'}+d_{1'}) + E(l-1,t,B_a)$$

However, similar to the uni-directional prediction, information of $R(l-1, t-T_0, B_{b0})$ and $R(l-1, t+T_1, B_{b1})$ cannot be obtained without decoding all the decoded signals in the immediately-lower layer.

Accordingly, by assuming that:

$$R(l-1,t-T_0,B_{b0}) \approx R(l,t-T_0,B_{c0})$$
$$R(l-1,t+T_1,B_{b1}) \approx R(l,t+T_1,B_{c1}) \quad (20)$$

the decoded signal DC components $R(l, t-T_0, B_{c0})$ and $R(l, t+T_1, B_{c1})$ of the immediately-upper blocks $B_0$ and $B_{c1}$ (of the blocks $B_{b0}$ and $B_{b1}$) in the relevant layer are used as substitutes.

Provided that quantization distortion contained in the decoded signal DC components of the relevant layer and the immediately-lower layer is not considerable, Formula (20) generally holds.

The invention then estimates $R(l-1, t, B_a)$ from the following formula.

$$R(l-1, t, B_a) \approx w_{0'} \cdot R(l, t-T_0, B_{c0}) + \qquad (21)$$
$$w_{0'} \cdot R(l, t+T_1, B_{c1}) + \left(\frac{1}{2}\right) \cdot (d_{0'} + d_{1'}) + E(l-1, t, B_a)$$

As in uni-directional prediction, there is a possibility here that the block $B_a$ includes a plurality of small blocks and contains a plurality of motion vectors.

In that case, as in uni-directional prediction, the DC component values of each of the small blocks are weighted in accordance with the areas of the small blocks, and their sum total is denoted by the decoded signal DC component $R(l-1, t, B_a)$ of the immediately-lower block $B_a$.

For example, let us suppose that the relevant block B has a size of 16×16, and the immediately-lower block $B_a$ contains two small blocks sized 4×4 and one small block sized 4×8. These small blocks are denoted by $B_a^0$, $B_a^1$, and $B_a^2$.

Let $B_{b0}^0$, $B_{b0}^1$, $B_{b0}^2$, $B_{b1}^0$, $B_{b1}^1$, and $B_{b1}^2$ be reference blocks for bi-prediction of the small blocks $B_a^0$, $B_a^1$, and $B_a^2$ respectively, and let $B_{c0}^0$, $B_{c0}^1$, $B_{c0}^2$, $B_{c1}^0$, $B_{c1}^1$, and $B_{c1}^2$ be immediately-upper blocks in the relevant layer at spatially the same positions as these reference blocks.

Furthermore, let $(w_0^{0\prime}, d_0^{0\prime})$, $(w_1^{0\prime}, d_1^{0\prime})$, $(w_0^{1\prime}, d_0^{1\prime})$, $(w_1^{1\prime}, d_1^{1\prime})$, and $(w_0^{2\prime}, d_0^{2\prime})$, $(w_1^{2\prime}, d_1^{2\prime})$ be weight coefficients assigned respectively to the small blocks $B_a^0$, $B_a^1$, and $B_a^2$.

At this time, the decoded signal DC component $R(l-1, t, B_a)$ of the block $B_a$ is calculated as follows.

$$R(l-1, t, B_a) = \qquad (22)$$
$$\frac{1}{4}\left(w_0^{0\prime} \cdot R(l, t-T_0, B_{c0}^0) + w_1^{0\prime} \cdot R(l, t, +T_1, B_{c1}^0) + \frac{1}{2}(d_0^{0\prime} + d_1^{0\prime}) + E(l-1, t, B_a^0)\right) + \frac{1}{4}\left(w_0^{1\prime} \cdot R(l, t-T_0, B_{c0}^1) + w_1^{1\prime} \cdot R(l, t, +T_1, B_{c1}^1) + \frac{1}{2}(d_0^{1\prime} + d_1^{1\prime}) + E(l-1, t, B_a^1)\right) +$$
$$\frac{1}{2}\left(w_0^{2\prime} \cdot R(l, t-T_0, B_{c0}^2) + w_1^{2\prime} \cdot R(l, t, +T_1, B_{c1}^2) + \frac{1}{2}(d_0^{2\prime} + d_1^{2\prime}) + E(l-1, t, B_a^2)\right)$$

(4) Mixture of Uni-Directional Prediction and Bi-Prediction in Immediately-Lower Block $B_a$ The plurality of small blocks (e.g. 4×4) in the immediately-lower block $B_a$ can independently use one of uni-directional prediction and bi-prediction. Here, let us suppose that, via the same procedure as in (2) and (3), the decoded signal DC component value in each small block is weighted in accordance with the area of the respective small block, and their sum total is deemed to be the decoded signal DC component $R(l-1, t, B_a)$ of block $B_a$.

Now let us suppose that, as in (2) and (3), block B has a size of 16×16, and the immediately-lower block $B_a$ contains two small blocks sized 4×4 ($B_a^0$ and $B_a^1$) and one small block sized 4×8 ($B_a^2$).

In this example, $B_a^0$ and $B_a^2$ use uni-directional prediction, while $B_a^1$ uses bi-prediction. $B_{b0}^0$ and $B_{b0}^2$ respectively represent reference blocks for uni-directional prediction in small blocks $B_a^0$ and $B_a^2$, while $B_{b0}^1$ and $B_{b1}^1$ represent reference blocks for bi-prediction in small block $B_a^1$.

Let $B_{c0}^0$, $B_{c0}^2$, $B_{c0}^1$, $B_{c1}^1$ represent immediately-upper blocks in the relevant layer at spatially the same positions as those reference blocks.

Let $(w_0^0, d_0^{0\prime})$, $(w_0^{1\prime}, d_0^{1\prime})$, $(w_1^{1\prime}, d_1^{1\prime})$, and $(w_0^{2\prime}, d_0^{2\prime})$ represent the weight coefficients assigned respectively to the small blocks $B_a^0$, $B_a^1$, and $B_a^2$.

The decoded signal DC component $R(l-1, t, B_a)$ of the block $B_a$ is now calculated as follows.

$$R(l-1, t, B_a) = \frac{1}{4}\left(w_0^{0\prime} \cdot R(l, t-T_0, B_{c0}^0) + d_0^{0\prime} + E(l-1, t, B_a^0)\right) + \qquad (23)$$
$$\frac{1}{4}\left(w_0^{1\prime} \cdot R(l, t-T_0, B_{c0}^1) + w_1^{1\prime} \cdot R(l, t, +T_1, B_{c1}^1) + \frac{1}{2}(d_0^{1\prime} + d_1^{1\prime}) + E(l-1, t, B_a^1)\right) +$$
$$\frac{1}{2}\left(w_0^{2\prime} \cdot R(l, t-T_0, B_{c0}^2) + d_0^{2\prime} + E(l-1, t, B_a^2)\right)$$

As described above, the present invention is not implemented when the immediately-lower block $B_a$ uses intra prediction and the prediction does not employ constrained intra prediction. It is also not implemented when decoded signals of the immediately-upper blocks $B_{c0}$ and $B_{c1}$ of the prediction reference blocks $B_{b0}$ and $B_{b1}$ are not stored in a buffer for motion prediction.

In cases where the invention is not implemented, encoding is performed using another prediction method. Examples are JSVC weighted motion prediction, ordinary unweighted motion prediction, and intra prediction.

When the immediately-lower layer performs interframe prediction, if the weighted motion prediction in the immediately-lower layer achieves remarkably high performance, the DC component $E(l-1, t, B_a)$ of the prediction residual signal of the immediately-lower block $B_a$ will be close to zero.

In such cases, the DC component of the prediction residual signal need not be considered. Consequently, it need not be decoded, enabling the memory and calculation amount used for decoding to be further reduced. Therefore, when emphasis is being placed on reducing the memory and calculation amount, the DC component of the prediction residual signal need not be added.

There now follows an explanation of a test in which the invention is implemented in a JSVC reference encoder JSVM 8.0 to verify the encoding performance of weighted prediction (WP) that performs proportional coefficient correction and WP that performs offset coefficient correction in uni-directional prediction according to the invention.

In this test, WP of JSVM was used in encoding a base layer, whereas WP of the invention was applied to an enhancement layer. Performance verification was evaluated according to rate distortion characteristics when WP of JSVM was applied, and when WP of the invention was applied, to the enhancement layer.

Using three standard images of JSVC, City, Soccer, and Foreman, a white linear fade was mixed into 33 frames at the head of each image.

Two fade types, fade-in/out, were tested, and the 33 frames of this fade mixture portion were used as encoding target frames.

A QCIF image (having an image size of 176×144 pixels) at 30 fps was inputted to the base layer, and a CIF image (having an image size of 352×288 pixels) at 30 fps was inputted to the enhancement layer; the picture pattern was IPPP.

Four quantization parameter values (21, 24, 27, and 30) were tested, and the same values were applied to the base layer and the enhancement layer.

A comprehensive motion search was conducted, using only integer precision.

Table 2 gives encoding amount reductions achieved by implementing the present invention from the values of WP of JSVM. A maximum encoding amount reduction of 6.38% was achieved. Overall, reductions were greater in the fade-out images.

TABLE 2

Encoding Amount Reduction Rates (%) from JSVM WP

| | Fade-in | | | Fade-out | | |
|---|---|---|---|---|---|---|
| | City | Soccer | Foreman | City | Soccer | Foreman |
| Proportional Coefficient Correction | −0.40 | 0.09 | −0.13 | −2.64 | −1.79 | −1.11 |
| Offset Coefficient Correction | −0.34 | −0.32 | −0.78 | −6.38 | −3.65 | −3.13 |

Figure 7:
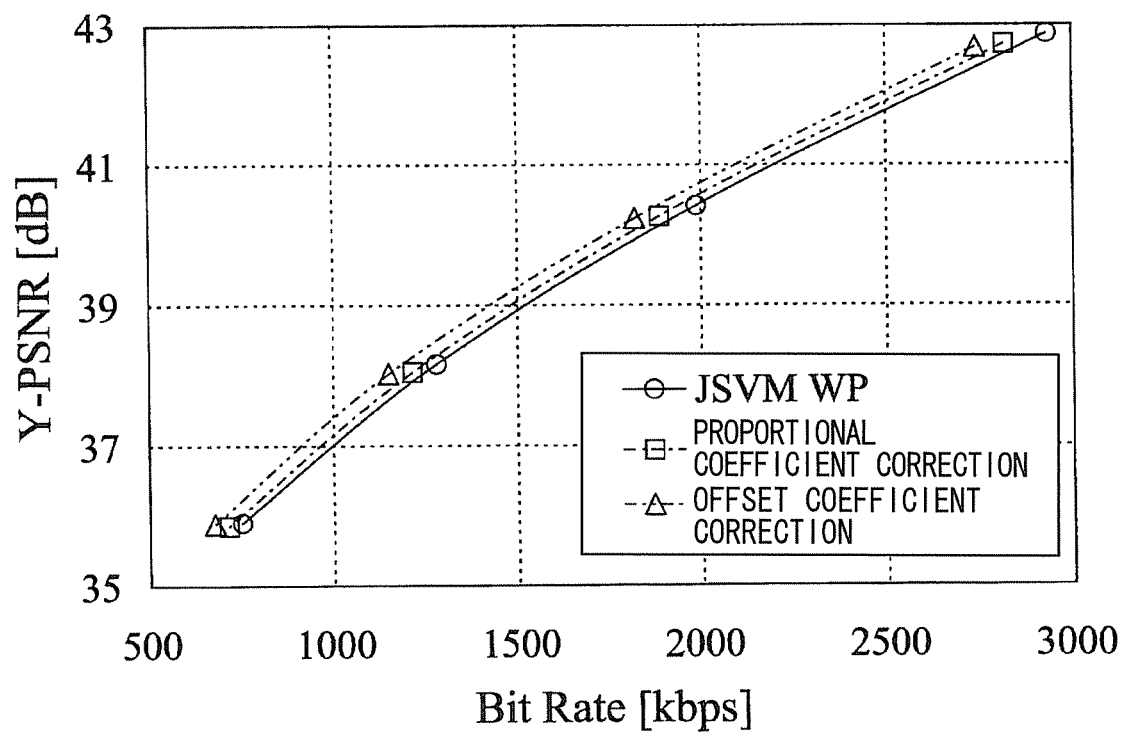
FIG. 7 An explanatory diagram of test results of a test performed in order to verify the effectiveness of the invention.

Referring to FIG. 7, the peak signal-to-noise ratio (PSNR) and the bitrate of each procedure were determined in the City fade-out image, which achieved the maximum reduction rate, and these were then compared ("Y-PSNR" represents PSNR of a luminance signal).

As is clear from FIG. 7, the procedure of the present invention can reduce the encoding amount, irrespective of the rate.

Comparing proportional coefficient correction and offset coefficient correction, while there is no difference between them in the fade-in images (not shown), offset coefficient correction is clearly more effective in the fade-out images.

In the performance verification, WP by offset coefficient correction achieved an average encoding amount reduction of 4.39% in fade-out images.

While this test illustrates encoding characteristics in unidirectional prediction, similar performance enhancement is expected in bi-prediction.

Embodiments

Figure 8:
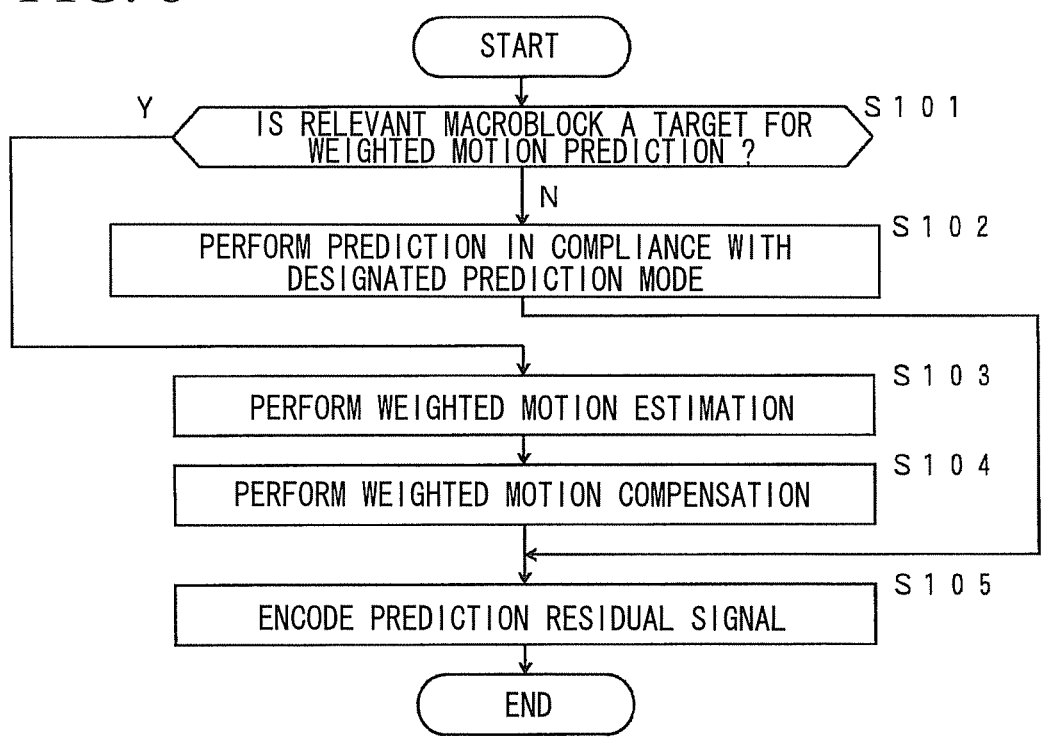
FIG. 8 A flowchart of an embodiment of an encoding process according to the invention.

Subsequently, the invention will be explained in detail in compliance with embodiments.
Processing Flow
Embodiment of Encoding Process Referring to FIG. 8, an embodiment of an encoding process according to the invention will be explained.

The embodiment explained here is an encoding process executed in a single macroblock. The entire encoding information is obtained by processing all macroblocks in this manner.

Step S101: Perform a determination process of determining whether the relevant macroblock in the enhancement layer is a target macroblock for weighted motion prediction; if it is, perform a process of Step S103, if it is not, perform a process of Step S102.

Step S102: Generate a prediction signal in compliance with the prediction mode information of the macroblock outputted in the process of Step S101.

Types of prediction methods include: intra prediction, ordinary unweighted motion prediction, and inter-layer prediction. One example of a prediction method for each of these methods is the prediction method in JSVM described in Non-Patent Document 3.

Figure 10:
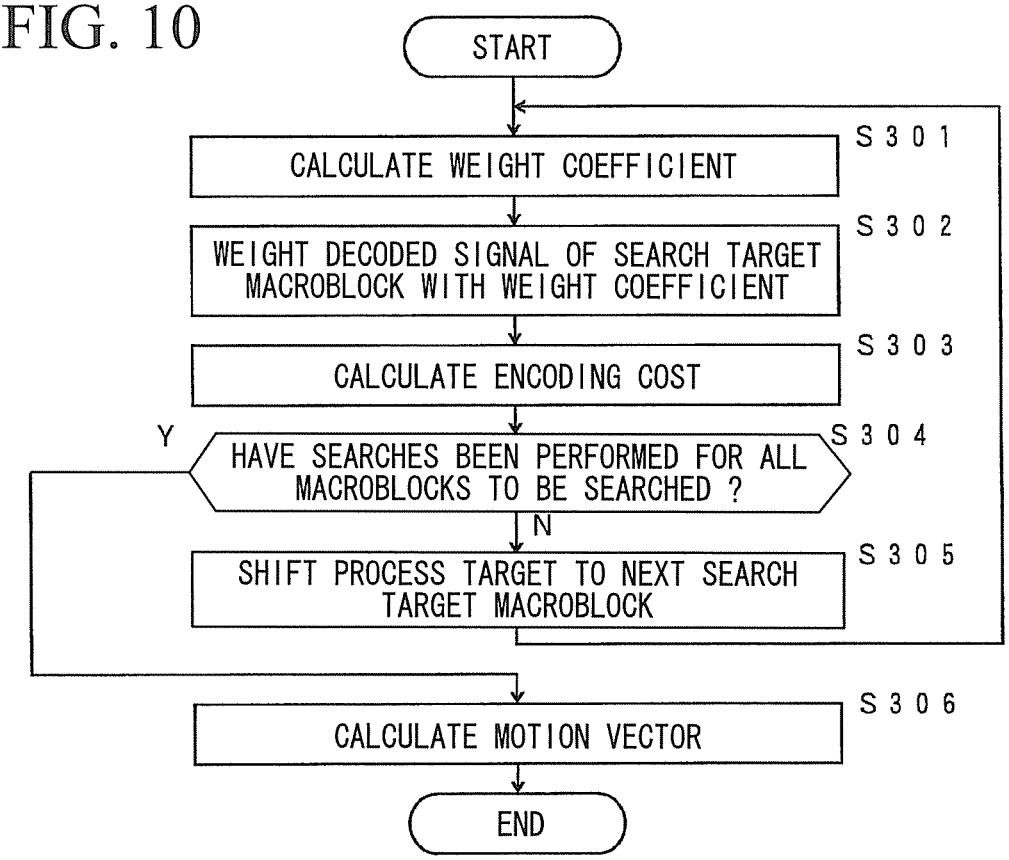
FIG. 10 A flowchart of an embodiment of a weighted motion estimation process according to the invention.

Step S103: Read the original signal of the relevant macroblock, the decoded signal of a search target macroblock (in a reference frame), and encoding information of the immediately-lower layer, perform a weighted motion estimation, and output motion vector information. FIG. 10 (explained later) illustrates this process in detail.

Figure 11:
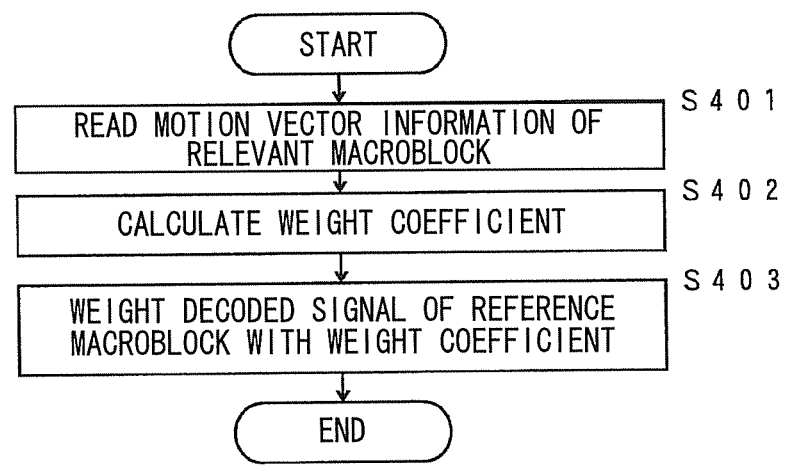
FIG. 11 A flowchart of an embodiment of a weighted motion compensation process according to the invention.

Step S104: Read the motion vector information outputted in the process of Step S103 and encoding information of the immediately-lower layer, perform weighted motion compensation, and output a weighted motion prediction signal. FIG. 11 (explained later) illustrates this process in detail.

Step S105: Read the prediction signal outputted by the process of Step S102 or Step S104, generate a difference signal between the prediction signal and the original signal of the relevant macroblock, and encode this difference signal.

Figure 9:
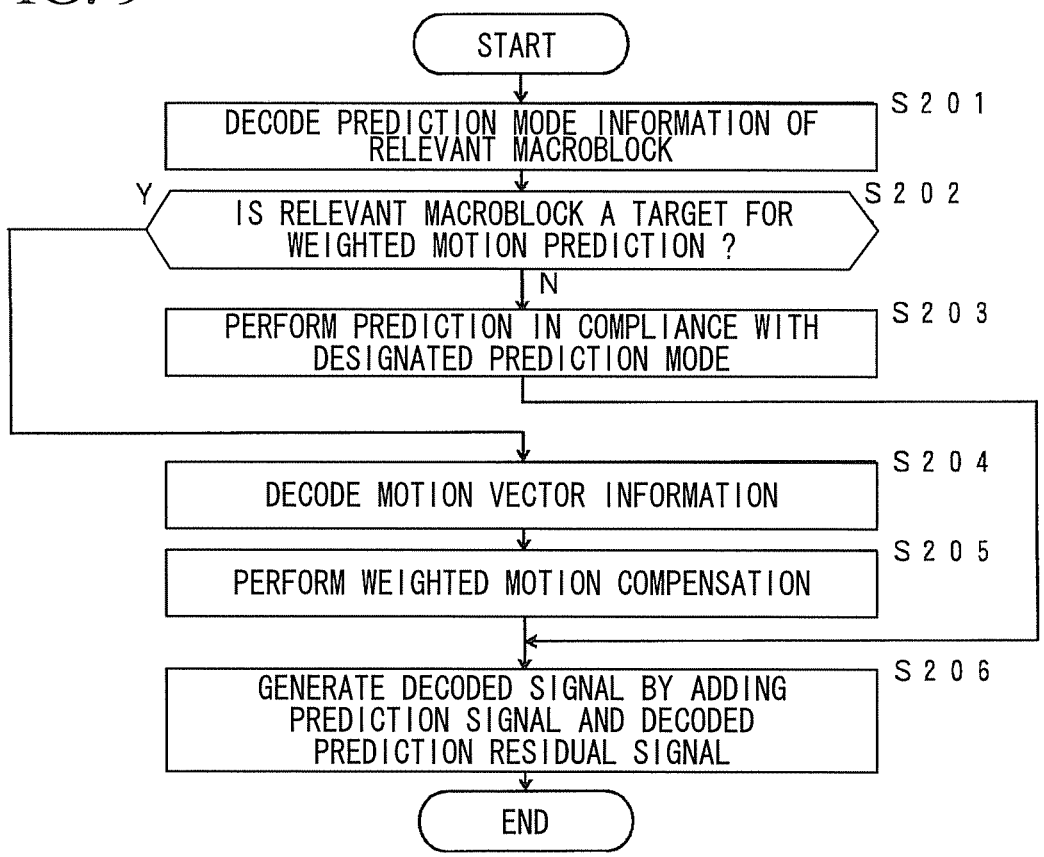
FIG. 9 A flowchart of an embodiment of a decoding process according to the invention.

One example of a process of encoding the difference signal is the encoding process in JSVM mentioned in Non-Patent Document 3.
Embodiment of Decoding Process Referring to FIG. 9, an embodiment of a decoding process according to the invention will be explained.

The embodiment explained here is a decoding process executed in a single macroblock. The total decoded signal is formed by processing all macroblocks in this manner.

Step S201: Read encoding information relating to prediction mode of the relevant macroblock in the enhancement layer, perform a decoding process, and output prediction mode information.

Step S202: Perform a determination process of determining whether the relevant macroblock in the enhancement layer is a target macroblock for weighted motion prediction; if Yes, perform a process of Step S204, if No, perform a process of Step S203.

Step S203: Generate a prediction signal in compliance with the prediction mode information of the relevant macroblock outputted in the process of Step S201. Types of prediction methods include intra prediction, ordinary unweighted motion prediction, and inter-layer prediction.

Step S204: Read the encoding information relating to the motion vector of the relevant macroblock, perform a decoding process, and output the motion vector.

Step S205: Read the motion vector information outputted in the process of Step S204 and immediately-lower layer encoding information, perform weighted motion compensation, and output a weighted motion prediction signal. FIG. 11 (described later) illustrates this process in detail.

Step S206: Read the prediction signal outputted in Step S203 or Step S205, add it to the decoded prediction residual signal to construct a decoded signal, and output this decoded signal.
Detailed Explanation of Process of Step S103

Referring to FIG. 10, an embodiment of weighted motion estimation process (the process of Step S103) according to the invention will be explained in detail.

Figure 12:
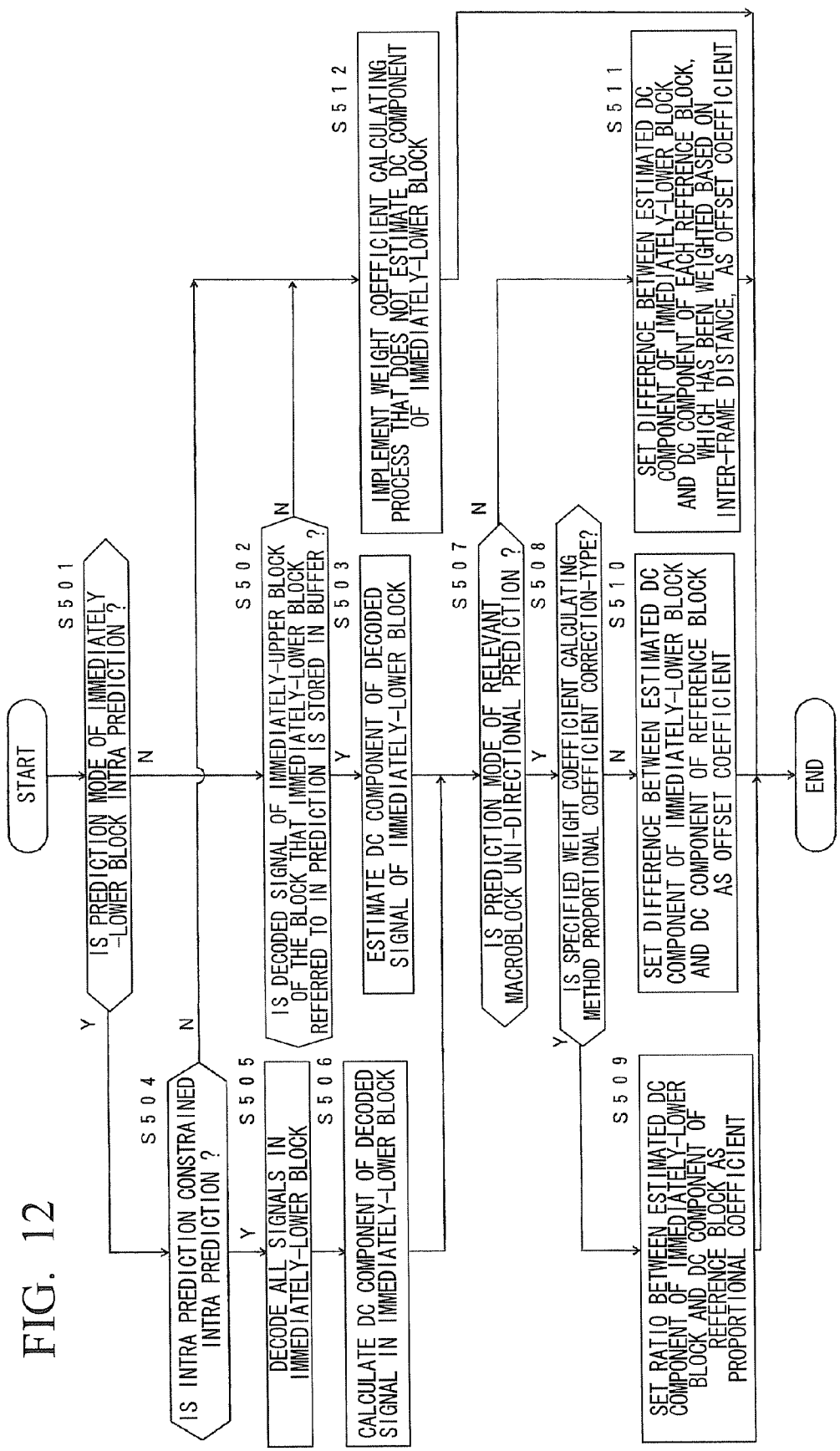
FIG. 12 A flowchart of an embodiment of a weight coefficient calculation process according to the invention.

Step S301: Read encoding information of immediately-lower layer and decoded signal of current search target macroblock, calculate weight coefficient to be applied to the search target macroblock, and output it. FIG. 12 (described later) illustrates this process in detail.

Step S302: Read the weight coefficient outputted in the process of Step S301, weight the decoded signal of the current search target macroblock with that weight coefficient, and output the weighted signal value.

Step S303: Calculate the encoding cost constituted by the encoding amount and encoding distortion amount between the signal value outputted in the process of Step S302 and the original signal of the relevant macroblock, and output it.

One example of this encoding cost is the Lagrange cost between encoding amount and encoding distortion due to square-error in the JSVM mentioned in Non-Patent Document 3.

Step S304: Perform determination process to determine whether searches have been performed for all macroblocks to be searched; if Yes, perform a process of Step S306, if No, perform a process of Step S305.

Step S305: Shift the process target to the next search target macroblock.

Step S306: Read information of encoding cost outputted in the process of Step S303, select a macroblock having the smallest encoding cost from among the macroblocks that were searched, and output the difference in coordinate positions between this macroblock and the relevant macroblock, as a motion vector.

Detailed Description of Processes of Step S104 and S205

Referring to FIG. 11, an embodiment of a weighted motion compensation process (processes of Steps S104 and S205) according to the invention will be explained.

Step S401: Read motion vector information of the relevant macroblock, and output it. For weighted motion compensation in an encoding process, this motion vector information is read from the output of the weighted motion estimation, whereas for weighted motion compensation in a decoding process, it is read from the output of the motion vector decoding process.

Step S402: Read the encoding information of an immediately-lower layer and the motion vector information outputted in the process of Step S401, calculate a weight coefficient for the reference macroblock indicated by the motion vector, and output it. FIG. 12 (described below) illustrates this process in greater detail.

Step S403: Read the weight coefficient information outputted in the process of Step S402, weight the decoded signal of the reference macroblock with that weight coefficient, and output the weighted signal value.

Detail Explanation of Processes of Step S301 and Step S402

Referring to FIG. 12, an embodiment of a weighted coefficient calculation process (processes of Steps S301 and S402) according to the invention will be explained.

Step S501: Read the encoding information of the immediately-lower layer, perform a determination process of determining whether the prediction mode of the immediately-lower block of the relevant macroblock is intra prediction; if Yes, perform a process of Step S504; if No, perform a process of Step S502.

Step S502: Perform a determination process of determining whether the decoded signal of an immediately-upper block of the reference block that the immediately-lower block referred to in motion prediction is stored in a buffer for motion prediction; if Yes, perform a process of Step S503; if No, perform a process of Step S512.

Figure 13:
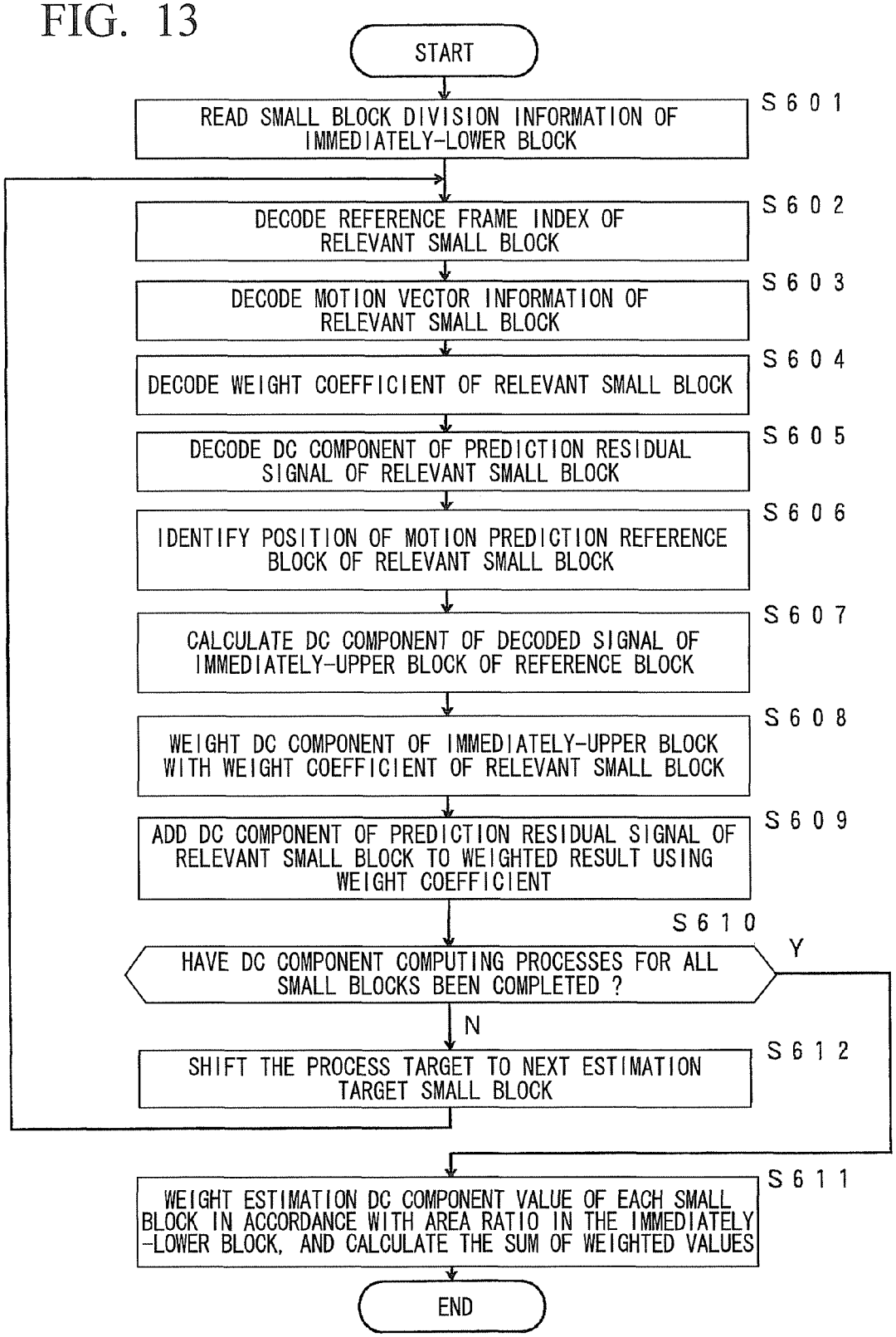
FIG. 13 A flowchart of an embodiment of an immediately-lower block DC component estimation process according to the invention.

Step S503: Read the encoding information of the immediately-lower layer and the decoded signal of the reference frame of the relevant layer, estimate a value of the DC component of the immediately-lower block, and output it. FIG. 13 (described below) illustrates this process in detail.

Step S504: Read the encoding information of the immediately-lower layer, perform a determination process of determining whether the intra prediction of the immediately-lower block of the relevant macroblock is constrained intra prediction; if Yes, perform a process of Step S505; if No, perform a process of Step S512.

Step S505: Read the encoding information of the immediately-lower layer, perform a decoding process of the immediately-lower block, reconstruct all the signals in the block, and output to the buffer.

Step S506: Read the decoded signal in the immediately-lower block from the buffer, calculate the DC component of the decoded signal in the immediately-lower block, and output to a register.

Step S507: Read the prediction mode information of the relevant macroblock, perform a determination process of determining whether the prediction mode is uni-directional prediction; if Yes, perform a process of Step S508; if No, perform a process of Step S511.

Step S508: Perform a determination process of determining whether an externally specified weight coefficient calculating method is proportional coefficient correction-type; if Yes, perform a process of Step S509; if No, perform a process of Step S510.

Here, "proportional coefficient correction-type" denotes a weight coefficient calculating method implemented in compliance with Formula (12) described earlier.

Generally, proportional coefficient correction-type is most effective in white fade-in images and black fade-out images. In contrast, offset coefficient correction-type, which is the weight coefficient calculating method implemented in compliance with Formula (13) described earlier, is most effective in white fade-out images and black fade-in images.

It is therefore preferable to determine this external specification information relating to the weight coefficient calculating method in compliance with a determination result of the fade type.

Step S509: Read the value of one of the DC component of the immediately-lower block estimated in the process of Step S503 and the DC component of the immediately-lower block calculated in the process of Step S506, set the ratio between that DC component value and the DC component value of the reference block as the proportional coefficient, set the offset coefficient at 0, and output them. This process complies with Formula (12) described above.

Step S510: Read the value of one of the DC component of the immediately-lower block estimated in the process of Step S503 and the DC component of the immediately-lower block calculated in the process of Step S506, set the difference between that DC component value and the DC component value of the reference block as the offset coefficient, set the proportional coefficient at 1, and output them. This process complies with Formula (13) described above.

Step S511: Read information relating to inter-frame distance between each reference block and the relevant block, set their ratio as a proportional coefficient, read the value of one of the DC component of the immediately-lower block estimated in the process of Step S503 and the DC component of the immediately-lower block calculated in the process of Step S506, set the difference between that DC component value and a value obtained by application of the proportional coefficient to each corresponding DC component of two reference blocks as an offset value, and output it. This process complies with Formula (14) described above.

Step S512: Implement a weight coefficient calculating method that does not refer to an estimated DC component of an immediately-lower block.

One conceivable example is the weight coefficient calculating method using implicit mode or explicit mode in JSVM mentioned in Non-Patent Document 3.

Detailed Explanation of Process of Step S503

Referring to FIG. 13, an embodiment of an estimation process of the DC component of an immediately-lower block (the process of Step S503) according to the invention will be explained.

Step S601: Read encoding information relating to division information of small blocks of the immediately-lower block, decode it, and identify the division structure of the small blocks of the immediately-lower block.

Step S602: Read encoding information relating to the reference frame index of the relevant small block, decode it, and write it in a register.

Step S603: Read encoding information relating to a motion vector of the relevant small block, decode it, and write it in a register.

Step S604: Read encoding information relating to a weight coefficient of the relevant small block, decode it, and write it in a register.

Step S605: Read encoding information relating to a DC component of a prediction residual signal of the relevant small block, decode it, and write it in a register.

Step S606: Read information of the reference frame index and the motion vector outputted in the processes of Step S602 and Step S603 from the registers, and identify the position of the motion prediction reference block of that small block.

Step S607: Read the decoded signal of the immediately-upper block of the reference block identified in the process of Step S606, calculate the DC component of the decoded signal, and write the DC component value in a register.

Step S608: Read the DC component value calculated in the process of Step S607 from the register, weight it with the weight coefficient calculated in the process of Step S604, and write the result value in a register.

Step S609: Read the weighted DC component value calculated in the process of Step S608 from the register, add to it the DC component value of the prediction residual signal calculated in the process of Step S605, assume the result value to be the estimation value (estimated value) of the DC component of the relevant block, and write it in a register.

Step S610: Perform a determination process of determining whether DC component estimation processes for all small blocks have been completed; if Yes, perform a process of Step S611; if No, perform a process of Step S612.

Step S611: Read the estimation DC component value of each small block calculated in the process of Step S609, weight the estimation DC component value of each small block in accordance with the area ratio between the small blocks in the immediately-lower block, assume the weighted sum as the estimation value of the DC component of the immediately-lower block, and output the sum.

Step S612: Shift the process target to the next DC component estimation target small block.

Processing Apparatuses

Exemplary Embodiment of Encoding Apparatus

Figure 14:
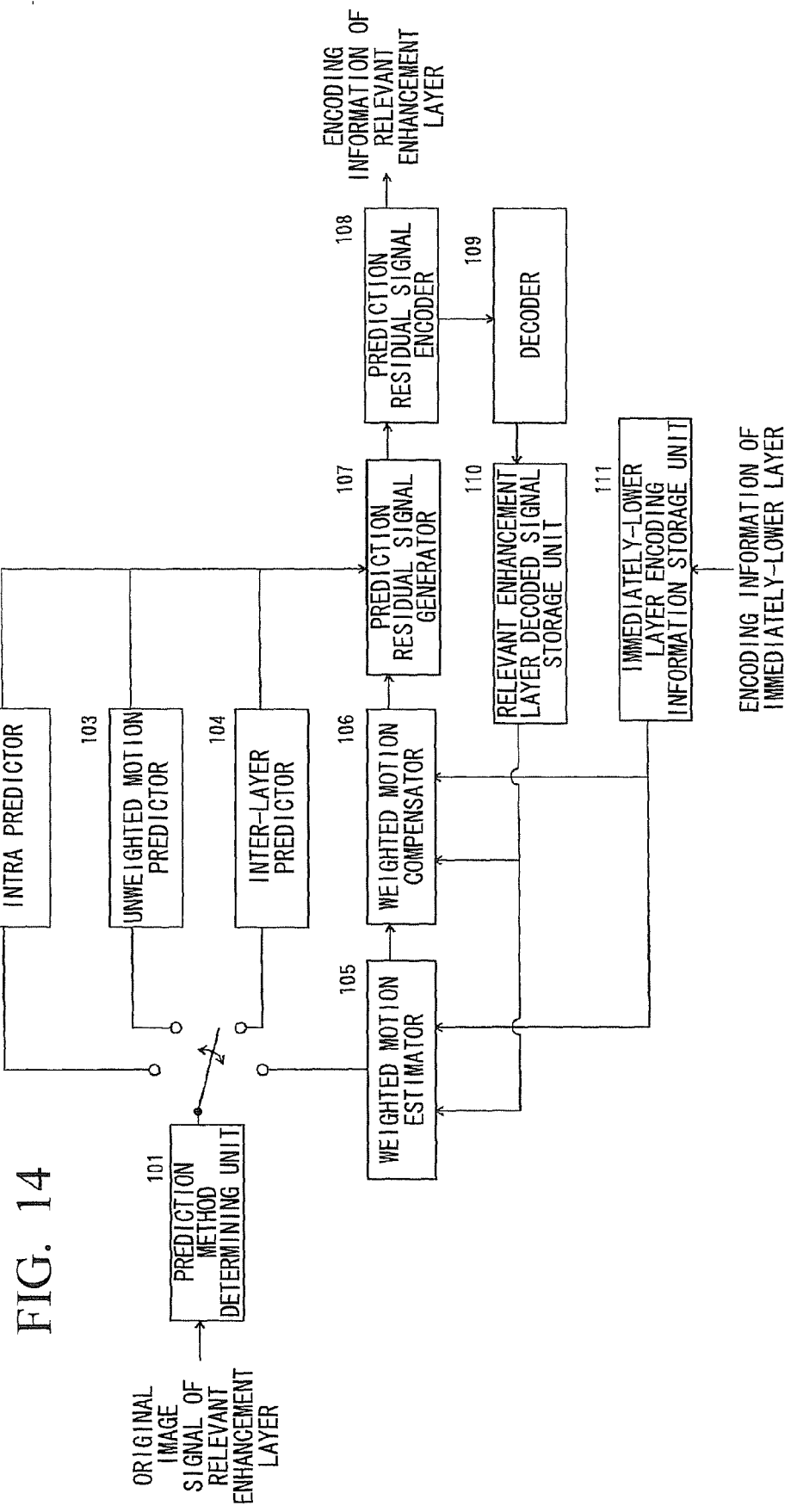
FIG. 14 A configuration diagram of an embodiment of an encoding apparatus according to the invention.

Referring to FIG. 14, an embodiment of an encoding apparatus according to the invention will be explained. FIG. 14 is a diagram of an apparatus that encodes one macroblock.

Prediction method determining unit 101: reads specification information specifying a prediction method for the relevant macroblock, and, in compliance with the specification information, shifts to a process of each predictor.

The prediction method determining unit 101 shifts to a process of an intra predictor 102 if the specified prediction method is intra prediction, to a process of an unweighted motion predictor 103 if it is ordinary unweighted prediction, to a process of an inter-layer predictor 104 if it is inter-layer prediction, and to a process of a weighted motion estimator 105 if it is weighted motion prediction.

Intra predictor 102: reads a target original signal and a corresponding decoded signal of an encoding target frame, executes intra prediction to generate a prediction signal, and outputs the prediction signal to a prediction residual signal generator 107.

One example of an intra prediction method is the intra prediction method of JSVM mentioned in Non-Patent Document 3.

Unweighted motion predictor 103: reads the target original signal of the encoding target frame and a target decoded signal of the reference frame, executes ordinary unweighted motion prediction to generate a prediction signal, and outputs this prediction signal to the prediction residual signal generator 107.

One example of an ordinary unweighted motion prediction method is the ordinary unweighted motion prediction method of JSVM mentioned in Non-Patent Document 3.

Inter-layer predictor 104: reads, for the encoding target frame, the target original signal and encoding information of the immediately-lower layer, executes inter-layer prediction to generate a prediction signal, and outputs the prediction signal to the prediction residual signal generator 107.

One example of an inter-layer prediction method is the inter-layer prediction method of JSVM mentioned in Non-Patent Document 3.

Figure 16:
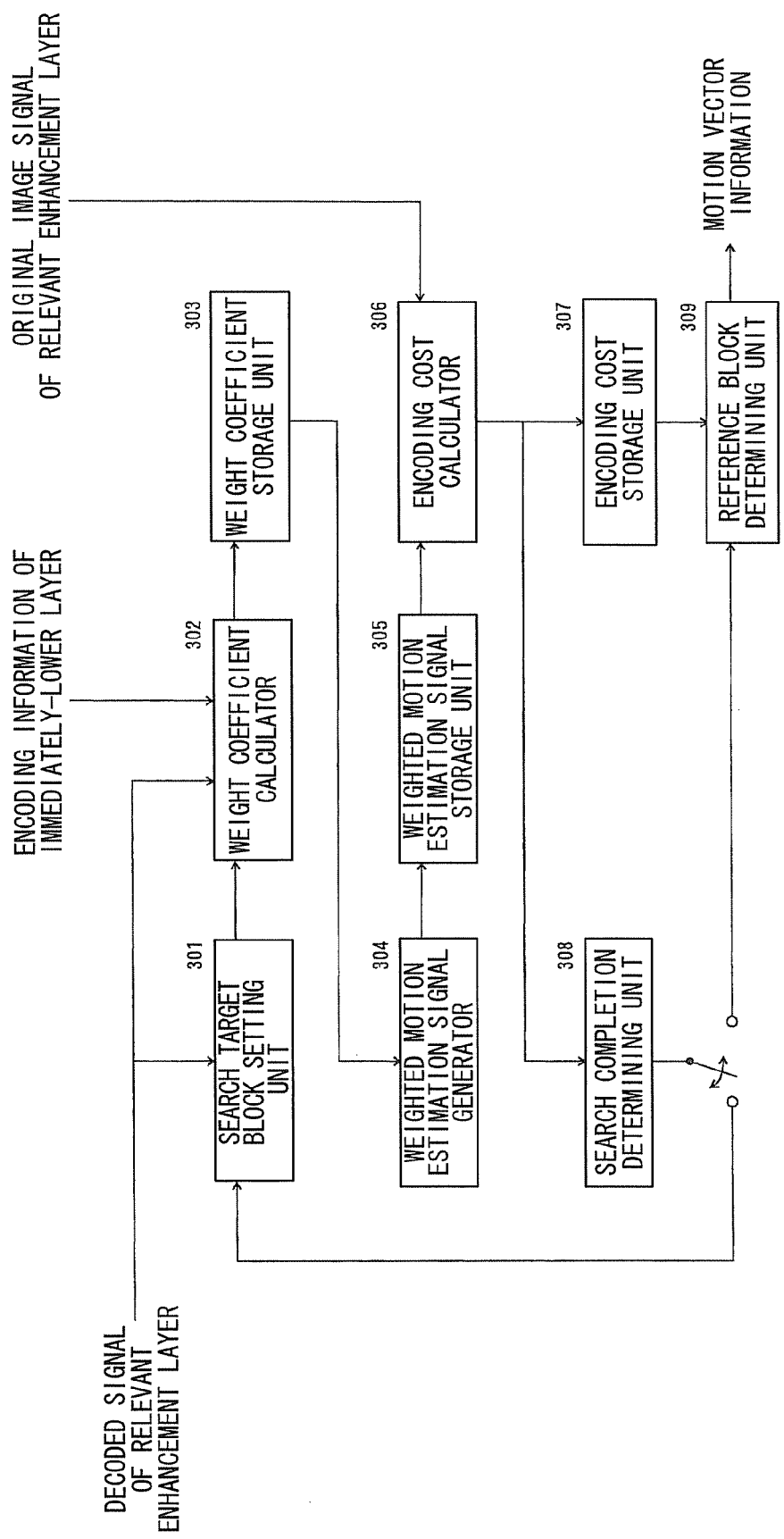
FIG. 16 A configuration diagram of an embodiment of a weighted motion estimator according to the invention.

Weighted motion estimator 105: reads, for the encoding target frame, the target original signal, a decoded signal of the reference frame outputted from a relevant enhancement layer decoded signal storage unit 110, and encoding information of the immediately-lower layer outputted from an immediately-lower layer encoding information storage unit 111, executes weighted motion estimation, generates a motion vector, and outputs the motion vector information to a weighted motion compensator 106. FIG. 16 (described below) illustrates a detailed configuration of the weighted motion estimator 105.

Figure 17:
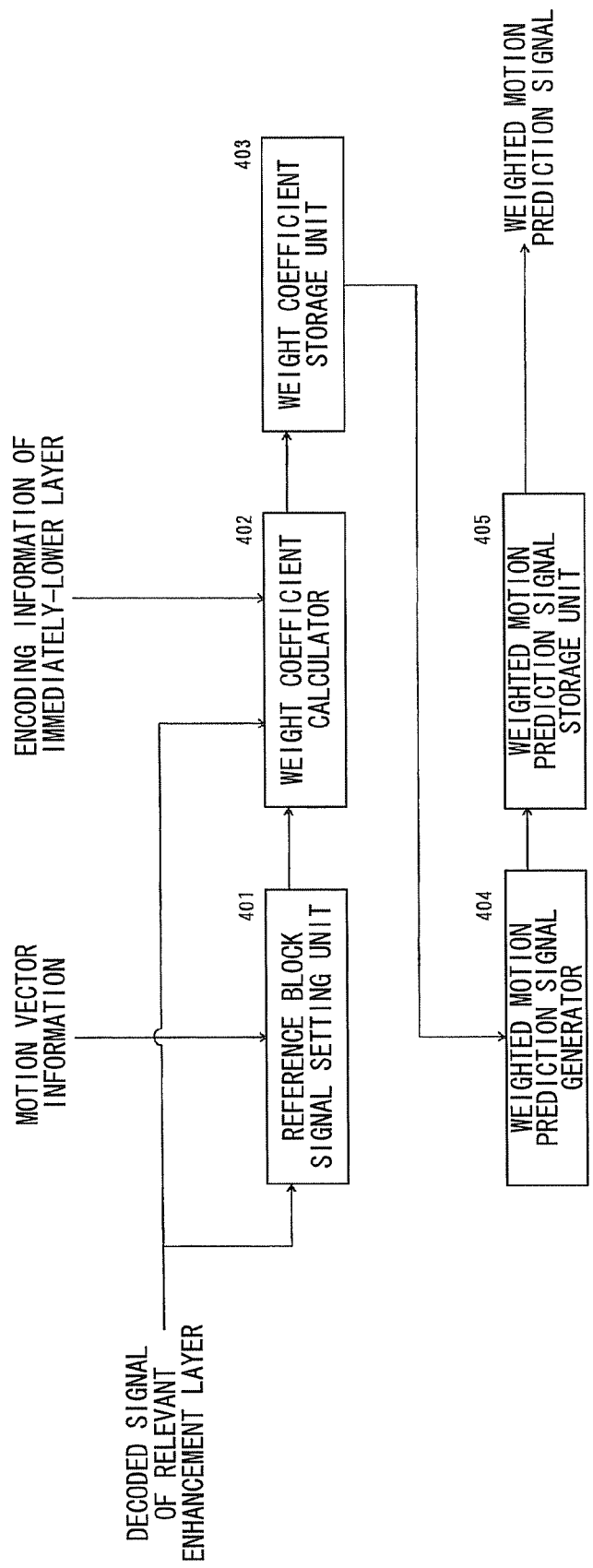
FIG. 17 A configuration diagram of an embodiment of a weighted motion compensator according to the invention.

Weighted motion compensator 106: reads the decoded signal of the reference frame outputted from the relevant enhancement layer decoded signal storage unit 110, and encoding information of the immediately-lower layer outputted from the immediately-lower layer encoding information storage unit 111, executes weighted motion compensation, generates a prediction signal, and outputs the prediction signal to the prediction residual signal generator 107. FIG. 17 (described below) illustrates a detailed configuration of the weighted motion compensator 106.

Prediction residual signal generator 107: reads the target original signal of the encoding target frame, and the prediction signal outputted from the intra predictor 102, or the unweighted motion predictor 103, or the inter-layer predictor 104, or the weighted motion compensator 106, generates a difference signal between the original signal and the prediction signal, and outputs the difference signal to the prediction residual signal encoder 108.

Prediction residual signal encoder 108: reads the prediction residual signal outputted from the prediction residual signal generator 107, performs an encoding process, and outputs the result as encoding information.

The encoding information is simultaneously outputted to a buffer, in order to input it to a decoder 109.

One example of this prediction residual signal encoding process is application of the series of processes including orthogonal transformation, quantization, and variable-length encoding of JSVM mentioned in Non-Patent Document 3.

Decoder 109: reads the encoding information from the buffer, performs a decoding process, and outputs the decoded signal thereby obtained to the relevant enhancement layer decoded signal storage unit 110.

Figure 15:
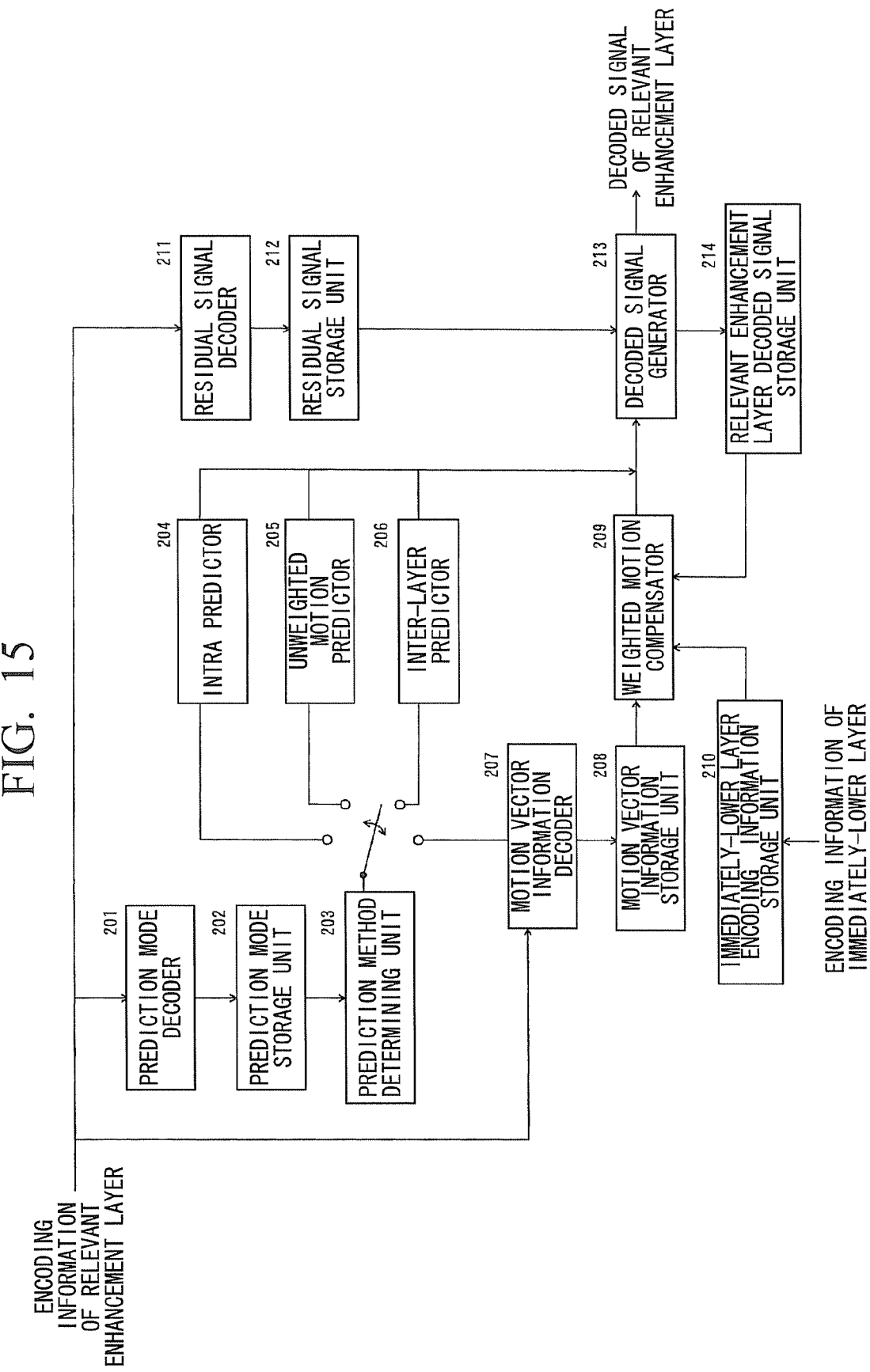
FIG. 15 A configuration diagram of an embodiment of a decoding apparatus according to the invention.

A decoding process in accordance with the present invention is applied to the above decoding process. FIG. 15 (described later) illustrates a detailed configuration of a decoding apparatus which functions as the decoder 109.

Immediately-lower layer encoding information storage unit 111: reads encoding information of the immediately-lower layer, and outputs it to a buffer.

Embodiment of Decoding Apparatus

Referring to FIG. 15, an embodiment of a decoding apparatus according to the invention will be explained. FIG. 15 is a diagram of an apparatus that decodes one macroblock in the relevant enhancement layer.

Prediction mode decoder 201: reads encoding information relating to a prediction mode for the relevant macroblock, performs a decoding process thereto, and outputs prediction mode information to a prediction mode storage unit 202.

Prediction method determining unit 203: reads prediction mode information from the prediction mode storage unit 202, and, in compliance with that specification information, shifts to a process of a predictor.

The prediction method determining unit 203 shifts to a process of an intra predictor 204 if the specified prediction method is intra prediction, to a process of an unweighted motion predictor 205 if it is ordinary unweighted prediction, to a process of an inter-layer predictor 206 if it is inter-layer prediction, and to a process of a motion vector information decoder 207 if it is weighted motion prediction.

Intra predictor 204: reads a target original signal and a corresponding decoded signal of an encoding target frame, executes intra prediction to generate a prediction signal, and outputs the prediction signal to a decoded signal generator 213.

Unweighted motion predictor 205: reads the target original signal of the encoding target frame and the target decoded signal of the reference frame, executes ordinary unweighted motion prediction to generate a prediction signal, and outputs this prediction signal to the decoded signal generator 213.

Inter-layer predictor 206: reads, for the encoding target frame, the target original signal and encoding information of the immediately-lower layer, executes inter-layer prediction to generate a prediction signal, and outputs the prediction signal to the decoded signal generator 213.

Motion vector information decoder 207: reads encoding information relating to the motion vector of the relevant macroblock, performs a decoding process thereof, and outputs motion vector information to a motion vector information storage unit 208.

Weighted motion compensator 209: reads the decoded signal of the reference frame outputted from a relevant enhancement layer decoded signal storage unit 214, and encoding information of the immediately-lower layer outputted from an immediately-lower layer encoding information storage unit 210, executes weighted motion compensation, generates a prediction signal, and outputs the prediction signal to the decoded signal generator 213. FIG. 17 (described below) illustrates a detailed configuration of the weighted motion compensator 209.

Immediately-lower layer encoding information storage unit 210: reads encoding information of the immediately-lower layer, and outputs it to a buffer.

Residual signal decoder 211: read encoding information relating to a residual signal of the relevant macroblock, performs a decoding process thereof, and outputs a residual signal to a residual signal storage unit 212.

Decoded signal generator 213: reads a prediction signal outputted from the intra predictor 204, or the unweighted motion predictor 205, or the inter-layer predictor 206, or the weighted motion compensator 209, synthesizes it with the residual signal read from the residual signal storage unit 212, generates a decoded signal, and outputs it.

The decoded signal generator 213 simultaneously writes the decoded signal to the relevant enhancement layer decoded signal storage unit 214.

Detailed Configuration of Weighted Motion Estimator 105

Referring to FIG. 16, an embodiment of the weighted motion estimator 105 according to this invention will be explained. FIG. 16 is a diagram of a device that performs a weighted motion estimation for one macroblock in the relevant enhancement layer.

Search target block setting unit 301: reads the decoded signal of the reference frame in the relevant enhancement layer, identifies a macroblock to be a search target of motion estimation, and outputs the decoded signal of that macroblock to a weight coefficient calculator 302.

Weight coefficient calculator 302: reads the decoded signal of the search target macroblock outputted from the search target block setting unit 301 and encoding information of the immediately-lower layer, calculates a weight coefficient to be applied to the search target macroblock, and outputs it to a weight coefficient storage unit 303.

Weighted motion estimation signal generator 304: reads the weight coefficient from the weight coefficient storage unit 303, weights the decoded signal of the search target macroblock with the weight coefficient, and outputs the weighted signal to a weighted motion estimation signal storage unit 305.

Encoding cost calculator 306: reads the original signal of the relevant macroblock from the relevant buffer, reads the weighted motion estimation signal from the weighted motion estimation signal storage unit 305, calculates an encoding cost constituted by the encoding amount and encoding distortion between the weighted motion estimation signal and the original signal of the relevant macroblock, outputs the encoding cost to an encoding cost storage unit 307, and shifts to a process of a search completion determining unit 308.

One example of this encoding cost is the Lagrange cost between the encoding amount and encoding distortion due to square-error in JSVM, mentioned in Non-Patent Document 3.

Search completion determining unit 308: perform a determination process of determining whether a search for weighted motion estimation in the relevant macroblock within the reference frame has been conducted for all candidates specified within the search range, and, if Yes, shifts to a process of a reference block determining unit 309, whereas if No, shifts to a process of the search target block setting unit 301.

Reference block determining unit 309: reads an encoding cost data group for all the search target macroblocks from the encoding cost storage unit 307, determines a search target macroblock with the smallest encoding cost to be a reference block, and outputs the difference between coordinate positions of this reference block and the relevant macroblock as motion vector information.

Detailed Configuration of Weighted Motion Compensators 106 and 209

Referring to FIG. 17, an embodiment of the weighted motion compensators 106 and 209 according to this invention will be explained. FIG. 17 is a diagram of a device that performs weighted motion compensation for one macroblock in the relevant enhancement layer.

Reference block signal setting unit 401: reads the decoded signal of the reference frame and the motion vector information, identifies a reference macroblock, and outputs the decoded signal of that macroblock to a weight coefficient calculator 402.

When the weighted motion compensator is installed inside an encoding apparatus (as is the case with weighted motion compensator 106), the motion vector information is applied from the weighted motion estimator 105, whereas when the weighted motion compensator is installed inside a decoding apparatus (as is the case with weighted motion compensator 209), the motion vector information is applied from the motion vector information decoder 207.

Weight coefficient calculator 402: reads decoded signal of the reference macroblock outputted from the reference block signal setting unit 401 and encoding information of the immediately-lower layer, calculates a weight coefficient to be implemented in the reference macroblock, and outputs it to a weight coefficient storage unit 403.

Weighted motion prediction signal generator 404: reads the weight coefficient from the weight coefficient storage unit 403, weights the decoded signal of the reference block with the weight coefficient, and outputs the weighted signal to a weighted motion prediction signal storage unit 405.

Detailed Configuration of Weight Coefficient Calculators 302 and 402

Figure 18:
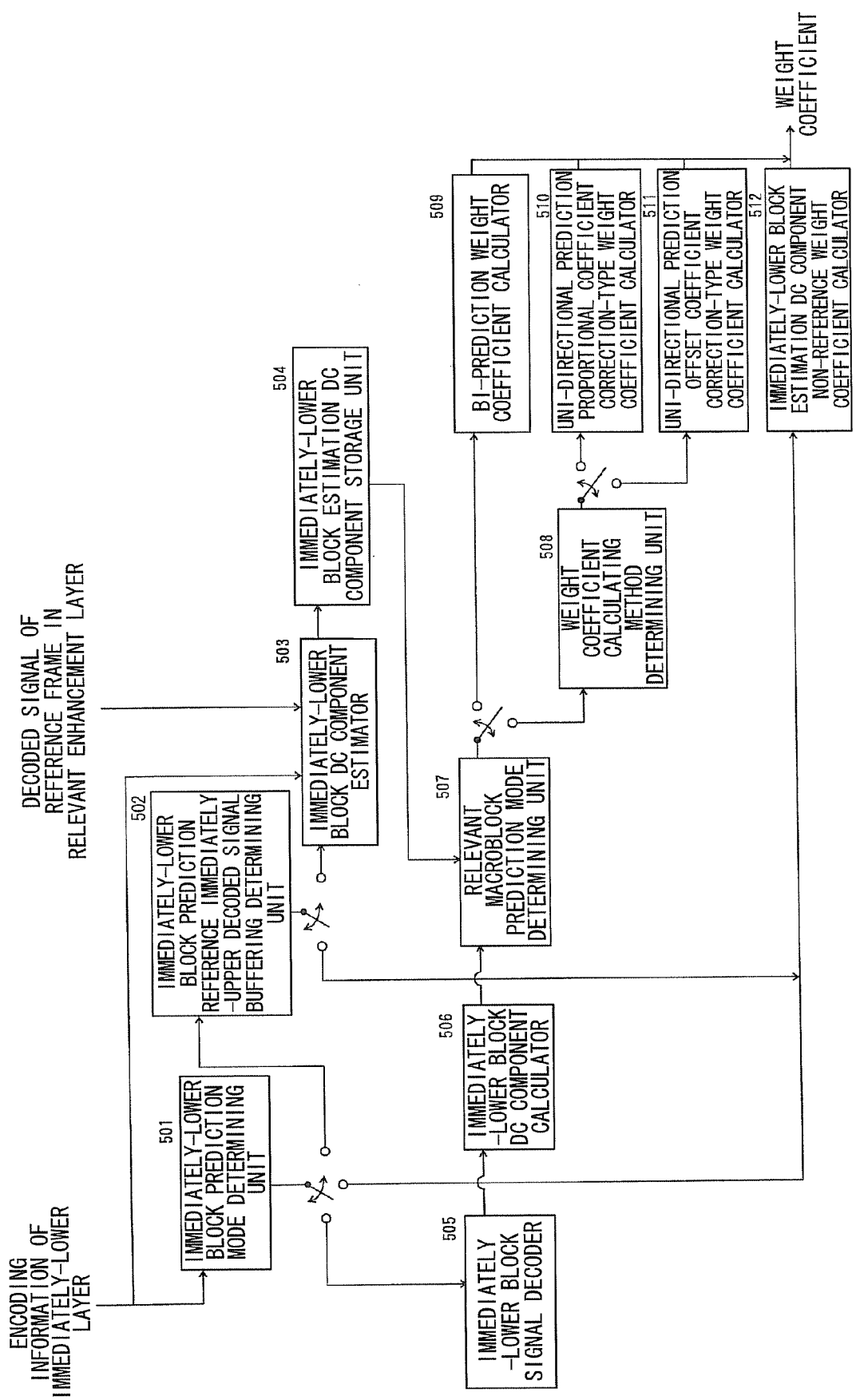
FIG. 18 A configuration diagram of an embodiment of a weight coefficient calculator according to the invention.

Referring to FIG. 18, an embodiment of the weight coefficient calculators 302 and 402 according to this invention will be explained. FIG. 18 is a diagram of a device that calculates a weight coefficient for one macroblock in the relevant enhancement layer.

Immediately-lower block prediction mode determining unit 501: reads encoding information of the immediately-lower layer, perform a determination process of a prediction mode of the immediately-lower block of the relevant macroblock, and, (i) when the prediction mode is intra prediction, and the prediction is constrained intra prediction, shifts to a process of an immediately-lower block signal decoder 505; (i) when the prediction mode is intra prediction, and the prediction is not constrained intra prediction, shifts to a process of an immediately-lower block estimation DC component non-reference weight coefficient calculator 512, (iii) when the prediction mode is interframe prediction, shifts to a process of an immediately-lower block prediction reference immediately-upper decoded signal buffering determining unit 502.

Immediately-lower block prediction reference immediately-upper decoded signal buffering determining unit 502: performs a determination process of determining whether a decoded signal of an immediately-upper block of the prediction reference block that the immediately-lower block refers to has been buffered, and if Yes, shifts to a process of an immediately-lower block DC component estimator 503, whereas if No, shifts to a process of the immediately-lower block estimation DC component non-reference weight coefficient calculator 512.

Figure 19:
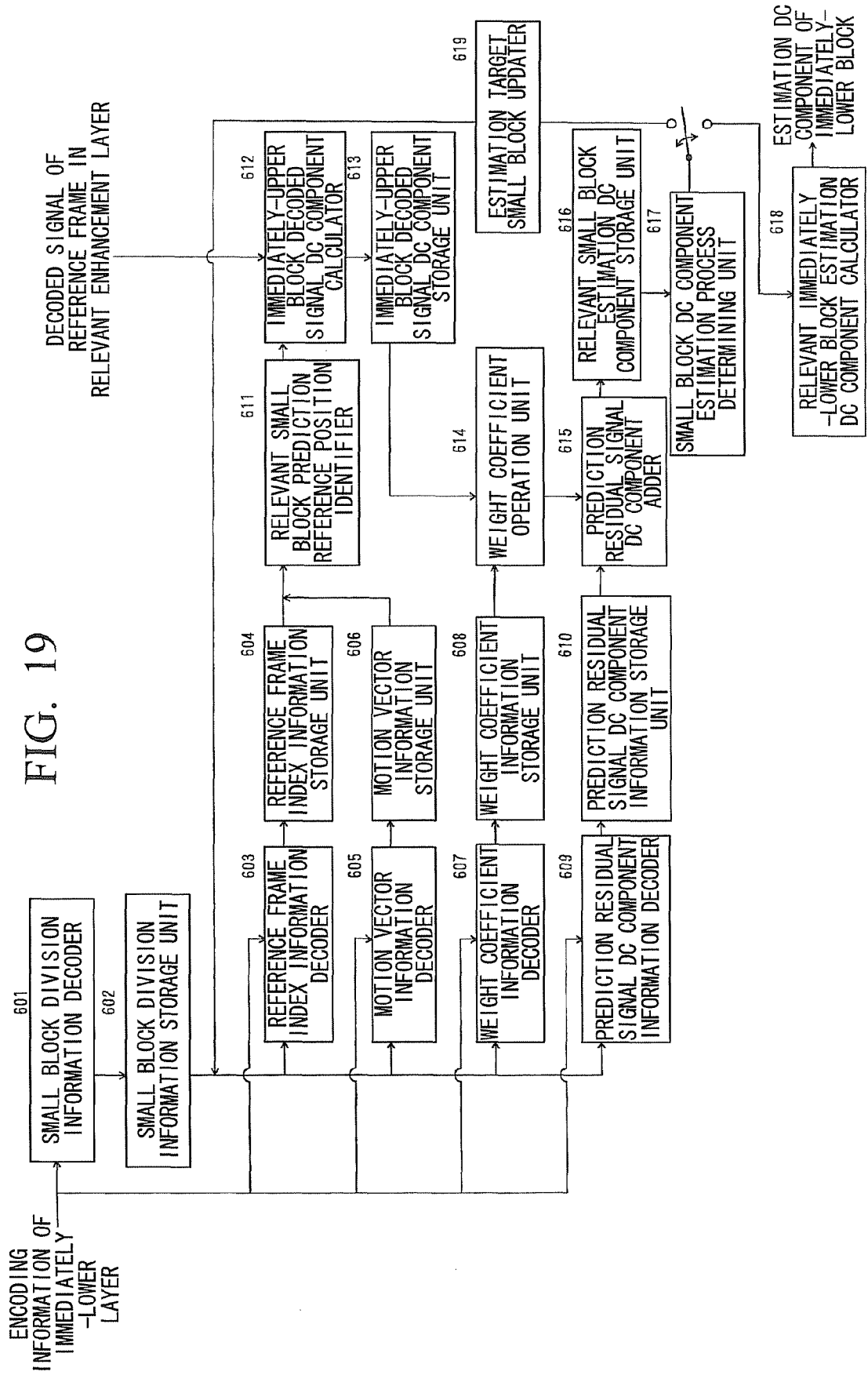
FIG. 19 A configuration diagram of an embodiment of an immediately-lower block DC component estimator according to the invention.

Immediately-lower block DC component estimator 503: reads encoding information of the immediately-lower layer and the decoded signal of the reference frame of the relevant layer, estimates a value for the DC component of the immediately-lower block, and outputs it to an immediately-lower block estimation DC component storage unit 504. FIG. 19 (described below) illustrates a detailed configuration of the immediately-lower block DC component estimator 503.

Immediately-lower block signal decoder 505: reads encoding information of the immediately-lower layer, reconstructs all decoded signals in the immediately-lower block, and outputs the relevant decoded signal to an immediately-lower block DC component calculator 506.

Immediately-lower block DC component calculator 506: reads the decoded signal in the immediately-lower block from the immediately-lower block signal decoder 505, calculates a DC component of the decoded signal in the immediately-lower block, and shifts to a relevant macroblock prediction mode determining unit 507.

Relevant macroblock prediction mode determining unit 507: reads prediction mode information of the relevant macroblock, performs a determination process of determining whether the prediction mode is uni-directional prediction, and if Yes, shifts to a process of a weight coefficient calculating method determining unit 508, whereas if No, shifts to a process of a bi-prediction weight coefficient calculator 509.

Weight coefficient calculating method determining unit 508: performs a determination process of determining whether an externally specified weight coefficient calculating method is proportional coefficient correction-type, and if Yes, shifts to a process of a uni-directional prediction proportional coefficient correction-type weight coefficient calculator 510, whereas if No, shifts to a process of a uni-directional prediction offset coefficient correction-type weight coefficient calculator 511.

Here, "proportional coefficient correction-type" denotes a weight coefficient calculating method implemented in compliance with Formula (12) described above.

Generally, proportional coefficient correction-type is most effective in white fade-in images and black fade-out images. In contrast, offset coefficient correction-type, which is the weight coefficient calculating method implemented in compliance with Formula (13) described earlier, is most effective in white fade-out images and black fade-in images.

It is therefore preferable to determine this external specification information relating to the weight coefficient calculating method in compliance with a determination result of the fade type.

Bi-prediction weight coefficient calculator 509: reads information relating to the inter-frame distance of each reference block and the relevant block, determines a proportional coefficient from the ratio between them, reads the value of the DC component of the immediately-lower block from the immediately-lower block estimation DC component storage unit 504, or from the immediately-lower block DC component calculator 506, and sets the difference between this DC component value and a value obtained by application of the proportional coefficient to each corresponding DC component value of the two reference blocks as an offset coefficient. This process complies with Formula (14) described above.

Uni-directional prediction proportional coefficient correction-type weight coefficient calculator 510: reads the value of the DC component of the immediately-lower block from the immediately-lower block estimation DC component storage unit 504, or from the immediately-lower block DC component calculator 506, sets the ratio between that DC component value and the DC component value of the reference block as a proportional coefficient, sets the offset coefficient at 0, and outputs the results. This process complies with Formula (12) described above.

Uni-directional prediction offset coefficient correction-type weight coefficient calculator 511: reads the value of the DC component of the immediately-lower block from the immediately-lower block estimation DC component storage unit 504, or from the immediately-lower block DC component calculator 506, sets the difference between that DC component value and the DC component value of the reference block as the offset coefficient, sets the proportional coefficient at 1, and outputs the results. This process complies with Formula (13) described above.

Immediately-lower block estimation DC component non-reference weight coefficient calculator 512: performs a weight coefficient calculating method that does not use the DC component of the immediately-lower block, and outputs the result.

As an example of this process, the weight coefficient calculating method in explicit mode or implicit mode in JSVM mentioned in Non-Patent Document 3 can be applied.

Detailed Configuration of Immediately-Lower block DC Component Estimator 503

Referring to FIG. 19, an embodiment of the immediately-lower block DC component estimator 503 according to the invention will be explained. FIG. 19 is a diagram of a device that performs an estimation of the immediately-lower block DC component for one macroblock in the relevant enhancement layer.

Small block division information decoder 601: reads encoding information relating to division information of small blocks in the immediately-lower block, performs decoding thereof, and outputs decoded small block division information to a small block division information storage unit 602.

Reference frame index information decoder 603: reads encoding information relating to a reference frame index of a relevant small block, performs decoding thereof, and outputs decoded reference frame index information to a reference frame index information storage unit 604.

Motion vector information decoder 605: reads encoding information relating to a motion vector of the relevant small block, performs decoding thereof, and outputs decoded motion vector information to a motion vector information storage unit 606.

Weight coefficient information decoder 607: reads encoding information relating to a weight coefficient of the relevant small block, performs decoding thereof, and outputs decoded weight coefficient information to a weight coefficient information storage unit 608.

Prediction residual signal DC component information decoder 609: reads encoding information relating to a DC component of a prediction residual signal of the relevant small block, performs decoding thereof, and outputs decoded DC component information of the prediction residual signal to a prediction residual signal DC component information storage unit 610.

Relevant small block prediction reference position identifier 611: reads decoded reference frame index and motion vector information from the reference frame index information storage unit 604 and the motion vector information storage unit 606 respectively, and identifies the position of a reference block for motion prediction of the relevant small block.

Immediately-upper block decoded signal DC component calculator 612: reads a decoded signal of an immediately-upper block of the reference block, which is identified by the relevant small block prediction reference position identifier 611, calculates a DC component of that decoded signal, and outputs the result to an immediately-upper block decoded signal DC component storage unit 613.

Weight coefficient operation unit 614: reads the DC component of the decoded signal of the immediately-upper block of the reference block from the immediately-upper block decoded signal DC component storage unit 613, reads a weight coefficient assigned to the relevant small block from the weight coefficient information storage unit 608, weights the DC component of the decoded signal of the immediately-upper block using the weight coefficient, and outputs a weighted DC component to a prediction residual signal DC component adder 615.

Prediction residual signal DC component adder 615: reads the value of the weighted DC component of the decoded signal of the immediately-upper block outputted from the weight coefficient operation unit 614, read the decoded DC component of the prediction residual signal from the prediction residual signal DC component information storage unit 610, adds both together, and outputs the result value to a relevant small block estimation DC component storage unit 616.

Small block DC component estimation process determining unit 617: performs a determination process of determining whether the DC component estimation process has been completed for all small blocks, if Yes, shifts to a relevant immediately-lower block estimation DC component calculator 618, whereas if No, shifts to an estimation target small block updater 619.

Relevant immediately-lower block estimation DC component calculator 618: reads the estimation DC component of each small block from the relevant small block estimation DC component storage unit 616, weights the estimation DC component of each small block in accordance with the area ratio of the small blocks in the relevant immediately-lower block, assumes the weighted sum as the estimation value of the DC component of the relevant immediately-lower block, and outputs the estimation value.

Estimation target small block updater 619: shifts the process target to the next DC component estimation target small block.

INDUSTRIAL APPLICABILITY

The present invention can be applied to video scalable encoding, and enables highly precise weighted motion prediction to be executed without transmitting a weight coefficient.

The invention claimed is:

1. In a video scalable encoding method of the type that calculates a weight coefficient which includes a proportional coefficient and an offset coefficient and indicates brightness variation between an encoding target image region and a reference image region in an upper layer, calculates a motion vector by applying the weight coefficient to an image signal of a reference image region as a search target and executing motion estimation, and generates a prediction signal by applying the weight coefficient to a decoded signal of a reference image region indicated by the motion vector and executing motion compensation, the improvement comprising:

determining a computation method for computing the proportional coefficient and the offset coefficient of the weight coefficient based on encoding information of an immediately-lower image region in an immediately-lower layer, which is present at spatially the same position as the encoding target image region;

identifying, when the immediately-lower image region performed interframe prediction in the immediately-lower layer, an immediately-lower layer reference image region that the immediately-lower image region used as a prediction reference for motion prediction;

calculating the weight coefficient by applying a weight coefficient that the immediately-lower image region used in weighted motion prediction to a DC component of an image region in the upper layer, which is present at spatially the same position as the immediately-lower layer reference image region; and determining a result of the application to be a DC component of the immediately-lower image region.

2. The video scalable encoding method in accordance with claim 1, wherein:

when there is one reference image region, the step that determines the computation method decides to use a ratio between a DC component of the reference image region and the DC component of the immediately-lower image region as the proportional coefficient, and decides to use zero as the offset coefficient.

3. The video scalable encoding method in accordance with claim 1, wherein:

when there is one reference image region, the step that determines the computation method decides to use a difference between a DC component of the reference image region and the DC component of the immediately-lower image region as the offset coefficient, and decides to use 1 as the proportional coefficient.

4. The video scalable encoding method in accordance with claim 1, wherein:

when there are two reference image regions, the step that determines the computation method decides to use a value calculated as the proportional coefficient in accordance with an inter-frame distance between the encoding target image region and each reference image region, and decides to use a value calculated as the offset coefficient by subtracting a value, which is obtained by multiplying each DC component of the two reference image regions by the corresponding proportional coefficient, from the DC component of the immediately-lower image region.

5. The video scalable encoding method in accordance with claim 1, wherein the step that calculates the weight coefficient:

adds a DC component of a prediction residual signal of the motion prediction generated in the immediately-lower image region to a value obtained by applying the weight coefficient that the immediately-lower image region used in the weighted motion prediction to the DC component of the image region in the upper layer, which is present at spatially the same position as the immediately-lower layer reference image region, and determines a result of the addition to be the DC component of the immediately-lower image region.

6. The video scalable encoding method in accordance with claim 1, wherein:

when the motion prediction of the immediately-lower image region was performed in small region units that are smaller than the immediately-lower image region, the step that calculates the weight coefficient calculates a DC component for each small region so as to obtain the relevant DC component, and, based on those calculated DC components and the areas of the respective small regions, calculates a DC component regarded as the relevant DC component.

7. In a video scalable decoding method of the type that calculates a weight coefficient which includes a proportional coefficient and an offset coefficient and indicates brightness variation between a decoding target image region and a reference image region indicated by a decoded motion vector in an upper layer, and executes motion compensation by applying the weight coefficient to a decoded signal of the reference image region indicated by the decoded motion vector, so as to generate a prediction signal, the improvement comprising:

determining a computation method for computing the proportional coefficient and the offset coefficient of the weight coefficient based on encoding information of an immediately-lower image region in an immediately-lower layer, which is present at spatially the same position as an encoding target image region;

identifying, when the immediately-lower image region performed interframe prediction in the immediately-lower layer, an immediately-lower layer reference image region that the immediately-lower image region used as a prediction reference for motion prediction;

calculating the weight coefficient by applying a weight coefficient that the immediately-lower image region used in weighted motion prediction to a DC component of an image region in the upper layer, which is present at spatially the same position as the immediately-lower layer reference image region; and determining a result of the application to be a DC component of the immediately-lower image region.

8. The video scalable decoding method in accordance with claim 7, wherein:

when there is one reference image region, the step that determines the computation method decides to use a ratio between a DC component of the reference image region and the DC component of the immediately-lower image region as the proportional coefficient, and decides to use zero as the offset coefficient.

9. The video scalable decoding method in accordance with claim 7, wherein:

when there is one reference image region, the step that determines the computation method decides to use a difference between a DC component of the reference image region and the DC component of the immediately-lower image region as the offset coefficient, and decides to use 1 as the proportional coefficient.

10. The video scalable decoding method in accordance with claim 7, wherein:

when there are two reference image regions, the step that determines the computation method decides to use a value calculated as the proportional coefficient in accordance with an inter-frame distance between the encoding target image region and each reference image region, and decides to use a value calculated as the offset coefficient by subtracting a value, which is obtained by multiplying each DC component of the two reference image regions by the corresponding proportional coefficient, from the DC component of the immediately-lower image region.

11. The video scalable decoding method in accordance with claim 7, wherein the step that calculates the weight coefficient:

adds a DC component of a prediction residual signal of the motion prediction generated in the immediately-lower image region to a value obtained by applying the weight coefficient that the immediately-lower image region used in the weighted motion prediction to the DC component of the image region in the upper layer, which is present at spatially the same position as the immediately-lower layer reference image region, and determines a result of the addition to be the DC component of the immediately-lower image region.

12. The video scalable decoding method in accordance with claim 7, wherein:

when the motion prediction of the immediately-lower image region was performed in small region units that are smaller than the immediately-lower image region, the step that calculates the weight coefficient calculates a DC component for each small region so as to obtain the relevant DC component, and, based on those calculated DC components and the areas of the respective small regions, calculates a DC component regarded as the relevant DC component.

13. In a video scalable encoding apparatus of the type that calculates a weight coefficient which includes a proportional coefficient and an offset coefficient and indicates brightness variation between an encoding target image region and a reference image region in an upper layer, calculates a motion vector by applying the weight coefficient to an image signal of a reference image region as a search target and executing motion estimation, and generates a prediction signal by applying the weight coefficient to a decoded signal of a reference image region indicated by the motion vector and executing motion compensation, the improvement comprising:

a device that determines a computation method for computing the proportional coefficient and the offset coefficient of the weight coefficient based on encoding information of an immediately-lower image region in an immediately-lower layer, which is present at spatially the same position as the encoding target image region; and a device that, when the immediately-lower image region performed interframe prediction in the immediately-lower layer, identifies an immediately-lower layer reference image region that the immediately-lower image region used as a prediction reference for motion prediction, and calculates the weight coefficient by applying a weight coefficient that the immediately-lower image region used in weighted motion prediction to a DC component of an image region in the upper layer, which is present at spatially the same position as the immediately-lower layer reference image region, and determining a result of the application to be a DC component of the immediately-lower image region.

14. The video scalable encoding apparatus in accordance with claim 13, wherein:

when there is one reference image region, the device that determines the computation method decides to use a ratio between a DC component of the reference image region and the DC component of the immediately-lower image region as the proportional coefficient, and decides to use zero as the offset coefficient.

15. The video scalable encoding apparatus in accordance with claim 13, wherein:

when there is one reference image region, the device that determines the computation method decides to use a difference between a DC component of the reference image region and the DC component of the immediately-lower image region as the offset coefficient, and decides to use 1 as the proportional coefficient.

16. The video scalable encoding apparatus in accordance with claim 13, wherein:

when there are two reference image regions, the device that determines the computation method decides to use a value calculated as the proportional coefficient in accordance with an inter-frame distance between the encoding target image region and each reference image region, and decides to use a value calculated as the offset coefficient by subtracting a value, which is obtained by multiplying each DC component of the two reference image regions by the corresponding proportional coefficient, from the DC component of the immediately-lower image region.

17. The video scalable encoding apparatus in accordance with claim 13, wherein the device that calculates the weight coefficient:

adds a DC component of a prediction residual signal of the motion prediction generated in the immediately-lower image region to a value obtained by applying the weight coefficient that the immediately-lower image region used in the weighted motion prediction to the DC component of the image region in the upper layer, which is present at spatially the same position as the immediately-lower layer reference image region, and determines a result of the addition to be the DC component of the immediately-lower image region.

18. The video scalable encoding apparatus in accordance with claim 13, wherein:

when the motion prediction of the immediately-lower image region was performed in small region units that are smaller than the immediately-lower image region, the device that calculates the weight coefficient calculates a DC component for each small region so as to obtain the relevant DC component, and, based on those calculated DC components and the areas of the respective small regions, calculates a DC component regarded as the relevant DC component.

19. In a video scalable decoding apparatus of the type that calculates a weight coefficient which includes a proportional coefficient and an offset coefficient and indicates brightness variation between a decoding target image region and a reference image region indicated by a decoded motion vector in an upper layer, and executes motion compensation by applying the weight coefficient to a decoded signal of the reference image region indicated by the decoded motion vector, so as to generate a prediction signal, the improvement comprising:

a device that determines a computation method for computing the proportional coefficient and the offset coefficient of the weight coefficient based on encoding information of an immediately-lower image region in an immediately-lower layer, which is present at spatially the same position as an encoding target image region; and a device that, when the immediately-lower image region performed interframe prediction in the immediately-lower layer, identifies an immediately-lower layer reference image region that the immediately-lower image region used as a prediction reference for motion prediction, and calculates the weight coefficient by applying a weight coefficient that the immediately-lower image region used in weighted motion prediction to a DC component of an image region in the upper layer, which is present at spatially the same position as the immediately-lower layer reference image region, and determining a result of the application to be a DC component of the immediately-lower image region.

20. The video scalable decoding apparatus in accordance with claim 19, wherein:

when there is one reference image region, the device that determines the computation method decides to use a ratio between a DC component of the reference image region and the DC component of the immediately-lower image region as the proportional coefficient, and decides to use zero as the offset coefficient.

21. The video scalable decoding apparatus in accordance with claim 19, wherein:

when there is one reference image region, the device that determines the computation method decides to use a difference between a DC component of the reference image region and the DC component of the immediately-lower image region as the offset coefficient, and decides to use 1 as the proportional coefficient.

22. The video scalable decoding apparatus in accordance with claim 19, wherein:

when there are two reference image regions, the device that determines the computation method decides to use a value calculated as the proportional coefficient in accordance with an inter-frame distance between the encoding target image region and each reference image region, and decides to use a value calculated as the offset coefficient by subtracting a value, which is obtained by multiplying each DC component of the two reference image regions by the corresponding proportional coefficient, from the DC component of the immediately-lower image region.

23. The video scalable decoding apparatus in accordance with claim 19, wherein the device that calculates the weight coefficient:

adds a DC component of a prediction residual signal of the motion prediction generated in the immediately-lower image region to a value obtained by applying the weight coefficient that the immediately-lower image region used in the weighted motion prediction to the DC component of the image region in the upper layer, which is present at spatially the same position as the immediately-lower layer reference image region, and determines a result of the addition to be the DC component of the immediately-lower image region.

24. The video scalable decoding apparatus in accordance with claim 19, wherein:

when the motion prediction of the immediately-lower image region was performed in small region units that are smaller than the immediately-lower image region, the device that calculates the weight coefficient calculates a DC component for each small region so as to obtain the relevant DC component, and, based on those calculated DC components and the areas of the respective small regions, calculates a DC component regarded as the relevant DC component.

25. A non-transitory computer-readable recording medium which stores a video scalable encoding program by which a computer executes a video scalable encoding method in accordance with claim 1.

26. A non-transitory computer-readable recording medium which stores a video scalable decoding program by which a computer executes a video scalable decoding method in accordance with claim 7.

* * * * *